United States Patent
Moriyama et al.

(10) Patent No.: US 9,447,229 B2
(45) Date of Patent: Sep. 20, 2016

(54) CRYSTALLINE POLYESTER RESIN, AND BINDER RESIN DISPERSION FOR TONER USING SAME

(71) Applicant: Nicca Chemical Co., Ltd.

(72) Inventors: Yasumichi Moriyama, Fukui (JP); Koji Ogawa, Fukui (JP); Masakazu Nishino, Fukui (JP); Toshiyuki Mikami, Fukui (JP)

(73) Assignee: NICCA CHEMICAL CO., LTD., Fukui (JP)

( * ) Notice: Subject to any disclaimer, the term of this patent is extended or adjusted under 35 U.S.C. 154(b) by 0 days.

(21) Appl. No.: 14/426,824

(22) PCT Filed: Sep. 11, 2013

(86) PCT No.: PCT/JP2013/074543
§ 371 (c)(1),
(2) Date: Mar. 9, 2015

(87) PCT Pub. No.: WO2014/042193
PCT Pub. Date: Mar. 20, 2014

(65) Prior Publication Data
US 2015/0247000 A1    Sep. 3, 2015

(30) Foreign Application Priority Data
Sep. 12, 2012 (JP) .................. 2012-200752

(51) Int. Cl.
*C08G 18/42* (2006.01)
*C08G 63/16* (2006.01)
(Continued)

(52) U.S. Cl.
CPC .............. *C08G 63/16* (2013.01); *C08L 67/02* (2013.01); *G03G 9/08755* (2013.01); *G03G 9/08795* (2013.01); *G03G 9/08797* (2013.01); *C08L 2201/54* (2013.01)

(58) Field of Classification Search
CPC ............. G03G 9/078; G03G 9/08755; G03G 9/08728; C08L 67/02; C08L 67/08
USPC ......................................................... 524/604
See application file for complete search history.

(56) References Cited

U.S. PATENT DOCUMENTS

| 3,853,778 A | 12/1974 | Buckley et al. |
| 2002/0018952 A1* | 2/2002 | Daimon ............. G03G 9/08755 430/109.4 |

(Continued)

FOREIGN PATENT DOCUMENTS

| CN | 1749867 A | 3/2006 |
| CN | 101174112 A | 5/2008 |

(Continued)

OTHER PUBLICATIONS

International Search Report, mailed on Dec. 17, 2013, PCT/JP2013/074543.

(Continued)

*Primary Examiner* — Jane L Stanley
(74) *Attorney, Agent, or Firm* — Jeremy Jay

(57) ABSTRACT

The invention provides a crystalline polyester resin obtained by condensation polymerization of a mixture comprising a polycarboxylic acid component and a polyol component, present in a range such that the ratio of the number of carboxyl groups from the polycarboxylic acid component and the number of hydroxyl groups from the polyol component is in the range of 100:108 to 100:120, and having an acid value of 5 to 20 mgKOH/g, wherein the polycarboxylic acid component includes a C8-12 aliphatic dicarboxylic acid, the content ratio of carboxyl groups from the C8-12 aliphatic dicarboxylic acid is at least 90 mol % of the total amount of carboxyl groups from the polycarboxylic acid component, the polyol component includes a C8-12 aliphatic diol, and the content ratio of hydroxyl groups from the C8-12 aliphatic diol is at least 90 mol % of the total amount of hydroxyl groups from the polyol component.

9 Claims, 1 Drawing Sheet

(51) Int. Cl.
*G03G 9/087* (2006.01)
*C08L 67/02* (2006.01)

(56) References Cited

U.S. PATENT DOCUMENTS

| | | | |
|---|---|---|---|
| 2009/0269691 A1* | 10/2009 | Yamato | G03G 9/08755 430/108.4 |
| 2011/0065039 A1* | 3/2011 | Ota | G03G 9/0821 430/109.3 |
| 2011/0217646 A1* | 9/2011 | Shirai | G03G 9/087 430/109.4 |
| 2011/0229816 A1 | 9/2011 | Shirai et al. | |
| 2013/0011779 A1 | 1/2013 | Yamashita et al. | |
| 2013/0244169 A1 | 9/2013 | Miyaake et al. | |

FOREIGN PATENT DOCUMENTS

| | | |
|---|---|---|
| CN | 102190871 A | 9/2011 |
| JP | S5613943 B2 | 4/1981 |
| JP | S6239428 B2 | 8/1987 |
| JP | 2006-243715 A | 9/2006 |
| JP | 2007-113077 A | 5/2007 |
| JP | 2004-191927 A | 7/2007 |
| JP | 2008-102353 A | 5/2008 |
| JP | 2008-158197 A | 7/2008 |
| JP | 2010-085612 A | 4/2010 |
| JP | 2010-102057 A | 5/2010 |
| JP | 2011-008024 A | 1/2011 |
| JP | 2011-197274 A | 10/2011 |
| JP | 2011-209712 A | 10/2011 |
| JP | 2012-128405 A | 7/2012 |
| WO | WO 2012/070388 A1 | 5/2012 |
| WO | WO 2013/058279 A1 | 4/2013 |

OTHER PUBLICATIONS

Notice of Decision to Grant a Patent, Japanese Application No. JP2014-535576 mailed Oct. 28, 2014 (decision to grant on first Office Action).

International Patentability Report, Japanese Application No. PCT/JP2013/074543, mailed on Mar. 17, 2015.

European Patent Office, Extended European Search Report in European Counterpart Application 13836346.0, mailed Sep. 10, 2015.

* cited by examiner

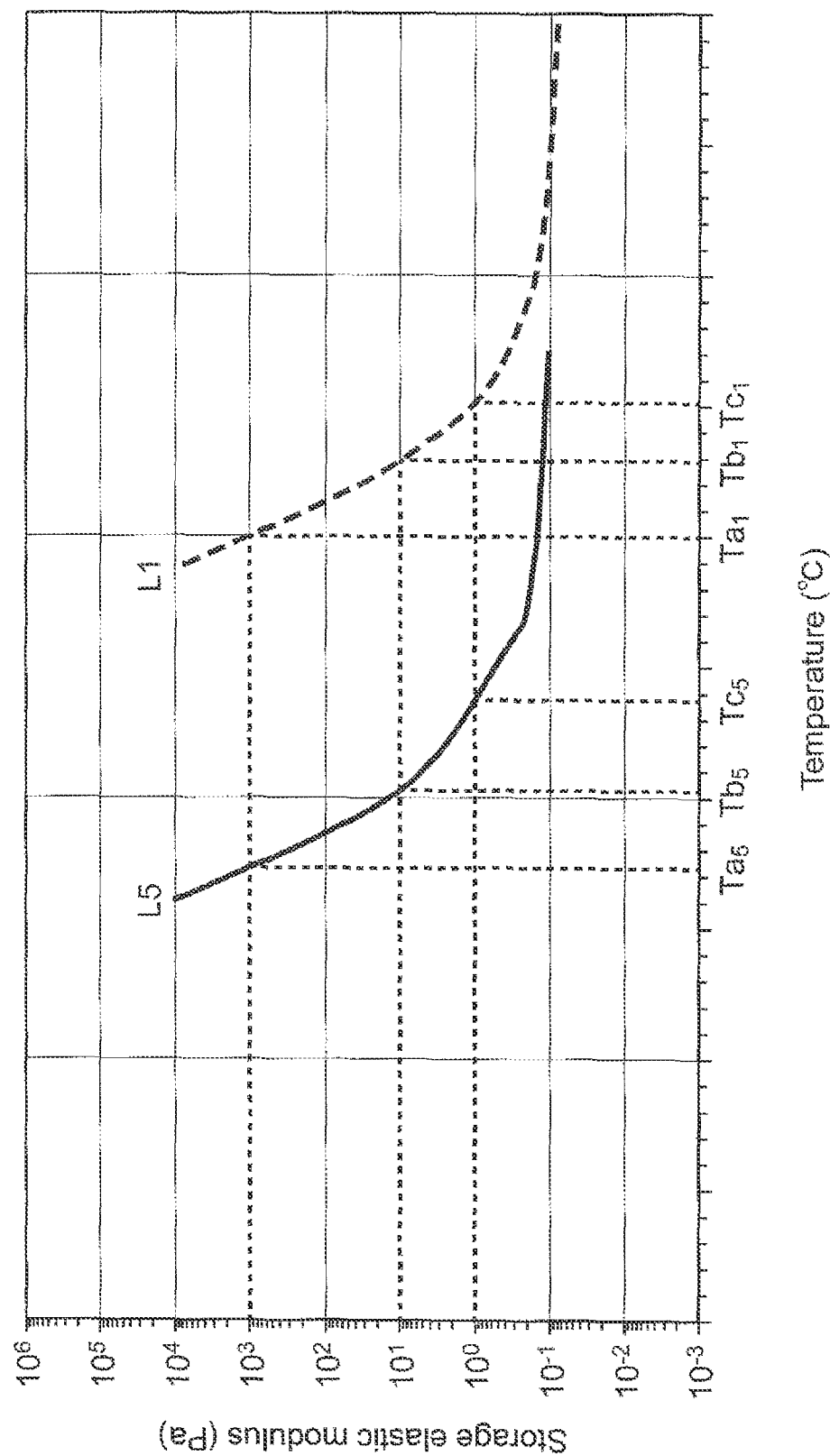

CRYSTALLINE POLYESTER RESIN, AND BINDER RESIN DISPERSION FOR TONER USING SAME

CROSS-REFERENCE TO RELATED APPLIATIONS

This application is the U.S. Nation Stage of International Application Number PCT/JP2013/074543, filed on Sep. 11, 2013, which claims the benefit of Japanese Patent Application Number P2012-200752, filed on Sep. 12, 2012, which are each incorporated by reference.

TECHNICAL FIELD

The present invention relates to a crystalline polyester resin and to a binder resin dispersion for toner using it. More specifically, the invention relates to a toner for electrophotography to be used for development of latent images formed by electrophotographic methods, electrostatic recording methods, electrostatic printing methods and the like, to a binder resin dispersion for toner to be used in the toner, and to a crystalline polyester resin to be used in the binder resin dispersion.

BACKGROUND ART

In recent years, reduction in energy consumption has been considered a major technical issue for electrophotographic devices. Another issue for electrophotographic devices is to significantly reduce the heat output of fixing devices.

By lowering the toner fixing temperature, it is possible to both save energy for the electrophotographic device while also allowing a wider range of toner anchoring conditions. In addition, this can shorten the latency time upon power activation of the electrophotographic device, required until the temperature of the surface of the fixing members such as fixing rolls reaches a temperature that allows fixing, known as the warm-up time, and can extend the life of the fixing member. However, lowering the toner fixing temperature also simultaneously lowers the glass transition point of the toner particles. It is therefore difficult to simultaneously achieve higher storability (blocking resistance) for toners. In order to achieve both toner fixability at low temperatures (a low-temperature fixability) and storability of the toner, it is necessary for the glass transition point of the toner to be maintained at higher temperatures. In addition, toner must have a "sharp melt property", whereby the viscosity of the toner rapidly falls in the high-temperature range.

For this reason, toners have been introduced that employ crystalline polyester resins. Crystalline polyester resins do not exhibit a clear glass transition temperature due to the regular arrangement of the molecular chains. Therefore, crystalline polyester resins have the property of being resistant to softening up to the crystal melting point. Much attention has therefore been directed toward materials that have both storability and a low-temperature fixability.

Methods of using crystalline polyester resins as binder resins have long been known (see PTL 1 and PTL 2, for example). However, crystalline polyester resins are difficult to pulverize by kneading pulverization methods, and their yields are low. Crystalline polyester resins therefore tend to be poorly practical from the viewpoint of productivity. If practical productivity can be achieved, this would allow the fixing temperature of the toner to be lowered. However, it is not always possible to obtain sufficient hot offset resistance. Because fused toner penetrates too deeply into paper, this tends to prevent high-density images from being obtained. In addition, crystalline polyester resins tend not to exhibit the electrical resistance necessary for electrification, due to the structures of the resins themselves. Consequently, crystalline polyester resins are generally studied for their use in combination with amorphous polyester resins.

The invention described in PTL 3 provides an electrostatic charge image developing toner having a low-temperature fixability as well as sufficient electrostatic properties. PTL 3 discloses an electrostatic charge image developing toner comprising at least a crystalline polyester resin and an amorphous polyester resin as binder resins, and having its surface covered with a surface layer composed mainly of an amorphous polyester resin, wherein the crystalline polyester resin content is in the range of 30 to 80 wt %, the proportion of crystalline polyester in the outermost surface of the electrostatic charge image developing toner is no greater than 15 atomic %, and the mean thickness of the surface layer is between 0.01 μm and 0.5 μm.

The invention described in PTL 4 relates to a crystalline polyester resin composed mainly of a C2-12 aliphatic diol and a C8-12 aliphatic dicarboxylic acid compound, and is obtained by condensation polymerization with a molar ratio (carboxylic acid component/alcohol component) of 1.03 to 1.20. According to the invention described in PTL 4, improved storability and environmental stability are obtained while maintaining the low-temperature fixability, by controlling the low-molecular-weight component which is a carboxyl group at the end of the crystalline polyester resin.

CITATION LIST

Patent Literature

[PTL 1] Japanese Examined Patent Application Publication SHO No. 56-13943
[PTL 2] Japanese Examined Patent Application Publication SHO No. 62-39428
[PTL 3] Japanese Unexamined Patent Application Publication No. 2004-191927
[PTL 4] Japanese Unexamined Patent Application Publication No. 2011-209712

SUMMARY OF INVENTION

Technical Problem

The toners described in PTLs 3 and 4 are known to exhibit effects compared to the prior art. At the current time, however, no toner has been provided that satisfies the demand for opposing properties including a low-temperature fixability, hot offset resistance, an image gloss property (gloss) and storability. It is a goal to develop a toner resin that has both an excellent low-temperature fixability, and a high level of hot offset resistance, image gloss property, storability and electrostatic property.

The present invention has been accomplished in light of these circumstances, and its object is to provide a crystalline polyester resin that allows production of an electrostatic charge image developing toner that is excellent in terms of its low-temperature fixability, hot offset resistance, storability and image gloss property.

Solution to Problem

As a result of diligent research with the aim of solving the aforementioned problems, the present inventors have completed this invention upon finding that a specific crystalline polyester resin can solve the aforementioned problems.

Specifically, the invention provides a crystalline polyester resin
obtained by condensation polymerization of a mixture comprising a polycarboxylic acid component and a polyol component,
present in a range such that the ratio of the number of carboxyl groups from the polycarboxylic acid component and the number of hydroxyl groups from the polyol component is in the range of 100:108 to 100:120,
and having an acid value of 5 to 20 mgKOH/g, wherein
the polycarboxylic acid component includes a C8-12 aliphatic dicarboxylic acid,
the content ratio of carboxyl groups from the C8-12 aliphatic dicarboxylic acid is at least 90 mol % of the total amount of carboxyl groups from the polycarboxylic acid component,
the polyol component includes a C8-12 aliphatic diol, and
the content ratio of hydroxyl groups from the C8-12 aliphatic diol is at least 90 mol % of the total amount of hydroxyl groups from the polyol component.

Stated differently, the invention provides a crystalline polyester resin obtained by condensation polymerization of a mixture comprising:

a polycarboxylic acid component including a C8-12 aliphatic dicarboxylic acid, the content ratio of carboxyl groups from the C8-12 aliphatic dicarboxylic acid being at least 90 mol % of the total amount of carboxyl groups from the polycarboxylic acid component, and a polyol component including a C8-12 aliphatic diol, the content ratio of hydroxyl groups from the C8-12 aliphatic diol being at least 90 mol % of the total amount of hydroxyl groups from the polyol component, which are present in a range such that the ratio of the number of carboxyl groups from the polycarboxylic acid component and the number of hydroxyl groups from the polyol component is in the range of 100:108 to 100:120, and having an acid value of 5 to 20 mgKOH/g.

The crystalline polyester resin of the invention having such a construction allows production of an electrostatic charge image developing toner that is excellent in terms of its low-temperature fixability, hot offset resistance, storability and image gloss property.

According to the invention, the mixture may further include a monocarboxylic acid, the ratio of the number of carboxyl groups from the polycarboxylic acid component and the number of carboxyl groups from the monocarboxylic acid being greater than 100:0 and up to 100:5. Stated differently, the mixture of the invention may further include a monocarboxylic acid, the ratio of the number of carboxyl groups from the polycarboxylic acid component and the number of carboxyl groups from the monocarboxylic acid being greater than 100:0 and up to 100:5.

With this crystalline polyester resin,
when the storage elastic modulus of the crystalline polyester resin measured at a cooling rate of 5° C./min is 1000 Pa to 1 Pa, the temperature of the crystalline polyester resin is 57° C. to 63° C., when the storage elastic modulus of the crystalline polyester resin measured at a cooling rate of 1° C./min is 1000 Pa to 1 Pa, the temperature of the crystalline polyester resin is 58° C. to 65° C., the rate of change D defined by formula (1) below is 1.3 to 4.0, the rate of change E defined by formula (2) below is 1.4 to 4.0, and the rate of change F defined by formula (3) below is 1.4 to 3.0.

[Mathematical Formula 1]

$$D = \frac{(\text{Log}10 - \text{Log}10^3)/(Tb_5 - Ta_5)}{(\text{Log}1 - \text{Log}10)/(Tc_5 - Tb_5)} \quad (1)$$

$$E = \frac{(\text{Log}1 - \text{Log}10)/(Tc_1 - Tb_1)}{(\text{Log}1 - \text{Log}10)/(Tc_5 - Tb_5)} \quad (2)$$

$$F = \frac{(\text{Log}10 - \text{Log}10^3)/(Tb_1 - Ta_1)}{(\text{Log}10 - \text{Log}10^3)/(Tb_5 - Ta_5)} \quad (3)$$

(In the formula,

Log represents common logarithm, $Ta_5$ represents the temperature of the crystalline polyester resin when the storage elastic modulus of the crystalline polyester resin measured at a cooling rate of 5° C./min is 1000 Pa, $Tb_5$ represents the temperature of the crystalline polyester resin when the storage elastic modulus of the crystalline polyester resin measured at a cooling rate of 5° C./min is 10 Pa, $Tc_5$ represents the temperature of the crystalline polyester resin when the storage elastic modulus of the crystalline polyester resin measured at a cooling rate of 5° C./min is 1 Pa, $Ta_1$ represents the temperature of the crystalline polyester resin when the storage elastic modulus of the crystalline polyester resin measured at a cooling rate of 1° C./min is 1000 Pa, $Tb_1$ represents the temperature of the crystalline polyester resin when the storage elastic modulus of the crystalline polyester resin measured at a cooling rate of 1° C./min is 10 Pa, and $Tc_1$ represents the temperature of the crystalline polyester resin when the storage elastic modulus of the crystalline polyester resin measured at a cooling rate of 1° C./min is 1 Pa.)

The crystalline polyester resin has a melting point of 65° C. to 75° C. and a weight-average molecular weight of 5000 to 12,000.

The crystalline polyester resin may have a volume electrical resistance of $1.0 \times 10^{12}$ Ω·cm or greater.

The invention provides a binder resin dispersion for toner comprising the aforementioned crystalline polyester resin and an aqueous medium, wherein the crystalline polyester resin is dispersed or emulsified in the aqueous medium.

Advantageous Effects of Invention

According to the invention it is possible to provide a crystalline polyester resin that allows production of an electrostatic charge image developing toner that is excellent in terms of its low-temperature fixability, hot offset resistance, storability and image gloss property.

BRIEF DESCRIPTION OF DRAWINGS

FIG. 1 is a semilogarithmic graph schematically showing the relationship between temperature and storage elastic modulus, when the storage elastic modulus of the crystalline polyester resin of this embodiment is measured at cooling rates of 5° C./min and 1° C./min, respectively.

DESCRIPTION OF EMBODIMENTS

For the purpose of this embodiment, a "crystalline" polyester resin is a polyester resin that exhibits a distinct crystal melting endothermic peak and has a melt entropy of greater than 5 mJ/mg. The value of the melt entropy is determined using indium as the standard substance. In contrast, an "amorphous" polyester resin is a polyester resin that does not exhibit a distinct crystal melting endothermic peak, and has a melt entropy of no greater than 5 mJ/mg, as determined from the melting endotherm peak area of its DSC (differential scanning calorimetry) curve.

The term "low-temperature fixability", for the purpose of this embodiment, refers to the resistance to troubles attributed mainly to toner (for example, poor melting of the toner, thin spots and dropouts in printing due to melting spots, or uneven color, and fixing defects) when the toner is fixed by heating at low temperature, i.e. at a temperature of below about 130° C. A lower minimum for the temperature at which toner can be fixed without trouble (the toner minimum fixing temperature) corresponds to a more satisfactory low-temperature fixability, and a greater effect on energy savings in an electrophotographic device.

The term "hot offset resistance", for the purpose of this embodiment, refers to resistance to troubles caused mainly by the toner during printing in a high temperature state (for example, printing thin spots or unevenness, bleeding, toner blotting or fusion of toner onto the rollers, that result from fixing defects when the toner itself breaks up between the print medium, the toner and the roller). Printing in a high temperature state is printing with heat accumulation inside the printer as a result of continuous printing or high-speed printing, causing transfer, heating or raising of the members such as the fixing roller to a high temperature state. The hot offset resistance is more satisfactory with a higher maximum for the temperature at which the toner can be fixed without trouble (the maximum fixing temperature of the toner).

The term "storability (blocking resistance)", for the purpose of this embodiment, refers to the storage stability of the toner. When a toner cartridge is placed in a harsh environment such as during transport or storage during the summer season, the toner particles tend to coalesce and aggregate. When coalescence or aggregation of the toner particles becomes notable, the toner does not flow even when vibration is applied, and it may not be usable as a toner. Storability (blocking resistance) is the resistance to this type of trouble.

The crystalline polyester resin of this embodiment will now be described.

The crystalline polyester resin of this embodiment:
is obtained by condensation polymerization of a mixture comprising a polycarboxylic acid component and a polyol component,
present in a range such that the ratio of the number of carboxyl groups from the polycarboxylic acid component and the number of hydroxyl groups from the polyol component is in the range of 100:108 to 100:120,
and having an acid value of 5 to 20 mgKOH/g, wherein the polycarboxylic acid component includes a C8-12 aliphatic dicarboxylic acid,
the content ratio of carboxyl groups from the C8-12 aliphatic dicarboxylic acid is at least 90 mol % of the total amount of carboxyl groups from the polycarboxylic acid component,
the polyol component includes a C8-12 aliphatic diol, and
the content ratio of hydroxyl groups from the C8-12 aliphatic diol is at least 90 mol % of the total amount of hydroxyl groups from the polyol component.

Stated differently, the crystalline polyester resin of this embodiment is obtained by condensation polymerization of a mixture comprising:
a polycarboxylic acid component including a C8-12 aliphatic dicarboxylic acid, the content ratio of carboxyl groups from the C8-12 aliphatic dicarboxylic acid being at least 90 mol % of the total amount of carboxyl groups from the polycarboxylic acid component, and
a polyol component including a C8-12 aliphatic diol, the content ratio of hydroxyl groups from the C8-12 aliphatic diol being at least 90 mol % of the total amount of hydroxyl groups from the polyol component,
which are present in a range such that the ratio of the number of carboxyl groups from the polycarboxylic acid component and the number of hydroxyl groups from the polyol component is in the range of 100:108 to 100:120,
and having an acid value of 5 to 20 mgKOH/g.

Chemical toner produced by aggregation following emulsification of a crystalline polyester resin having such a structure has no electrostatic inhibition. That is, the crystalline polyester resin allows production of an electrostatic charge image developing toner that is excellent in terms of its low-temperature fixability, hot offset resistance, storability and image gloss property.

The crystalline polyester resin of this embodiment is obtained by condensation polymerization of a mixture comprising a polycarboxylic acid component and a polyol component, wherein the ratio of the number of carboxyl groups (number of COOH groups) from the polycarboxylic acid component and the number of hydroxyl groups (number of OH groups) from the polyol component (number of COOH groups:number of OH groups) is in the range of 100:108 to 100:120, and is preferably obtained by condensation polymerization of a mixture comprising them with the ratio in the range of 100:110 to 100:115. When the number of OH groups is less than this range, this increases the gradient of change in the storage elastic modulus upon quenching as described below (cooling rate: 5° C./min), tending to narrow the temperature range in which crystallization of the crystalline polyester resin proceeds. This results in poor compatibility or dispersibility with the amorphous polyester resin described below, tending to make it difficult to obtain both a low-temperature fixability and an image gloss property. A number of OH groups greater than this range generates more unreacted alcohols or low-molecular-weight oligomers. Consequently, crystallization of the crystalline polyester resin does not proceed, and the hot offset resistance and storability tend to be unsatisfactory. The obtained toner also tends to generate undesirable odor. For this embodiment, the polycarboxylic acid component and the monocarboxylic acid component, described below, include not only carboxylic acids but also corresponding ester derivatives that can generate carboxyl groups. Preferred corresponding ester derivatives are C1-3 lower alkyl esters. The number of COOH groups includes not only the number of carboxyl groups but also the number of ester groups derived from ester derivatives.

The polycarboxylic acid component to be used in a crystalline polyester resin of this embodiment includes a C8-12 aliphatic dicarboxylic acid, and preferably includes a C10-12 aliphatic dicarboxylic acid. The C8-12 aliphatic dicarboxylic acid is preferably a straight-chain aliphatic dicarboxylic acid. If the C8-12 aliphatic dicarboxylic acid is a branched aliphatic dicarboxylic acid, the crystallinity of the polyester resin will tend to be reduced, lowering the melting point (Tm). It will therefore tend to lower the hot offset resistance and storability. If the number of carbon atoms is less than 8, the number of ester groups in the crystalline polyester resin will be too great, tending to make it difficult to ensure a sufficient charge. If the number of carbon atoms is greater than 12, the melting point (Tm) will tend to be too high. The low-temperature fixability and image gloss property will therefore tend to be reduced.

C8-12 aliphatic dicarboxylic acids include suberic acid (1,8-octanedioic acid), azelaic acid, sebacic acid, 1,10-decanedicarboxylic acid, 1,12-dodecanedioic acid, and their acid anhydrides, as well as their lower alkyl (preferably C1-3) esters. From the viewpoint of the electrostatic property, hot offset resistance, storability and low-temperature fixability, the content of the C8-12 aliphatic carboxylic acid (content ratio) is preferably such that the number of COOH groups from the C8-12 aliphatic dicarboxylic acid is at least 90 mol %, and preferably 95 mol %, of the number of COOH groups from the polycarboxylic acid component. Two or more different C8-12 aliphatic dicarboxylic acids may also be used in combination. From the viewpoint of increasing the crystallinity of the crystalline polyester, the C8-12 aliphatic dicarboxylic acid used is more preferably a single type alone.

Examples of other polycarboxylic acid compounds to be included in the polycarboxylic acid component include aromatic dicarboxylic acid compounds, C2-7 aliphatic dicarboxylic acid compounds, and trivalent or greater aromatic polybasic carboxylic acid compounds, as well as their acid anhydrides and their lower alkyl (preferably C1-3) esters, with no particular restriction to these.

The aromatic dicarboxylic acid compound also includes aromatic dicarboxylic acid derivatives that can serve as structural units that are the same structural units derived from aromatic dicarboxylic acids by condensation reaction. Specific examples of aromatic dicarboxylic acid compounds include aromatic dicarboxylic acids such as phthalic acid, isophthalic acid and terephthalic acid, as well as their acid anhydrides and their alkyl(C1-3)esters. Examples for alkyl groups in the alkyl esters include methyl, ethyl, propyl and isopropyl groups.

Examples of C2-7 aliphatic dicarboxylic acid compounds include oxalic acid, malonic acid, maleic acid, fumaric acid, citraconic acid, itaconic acid, glutaconic acid, succinic acid, adipic acid and the like; succinic acid derivatives such as dodecylsuccinic acid, dodecenylsuccinic acid and octenylsuccinic acid; and their acid anhydrides and their acid alkyl(C1-3)esters. Examples of trivalent or greater aromatic polybasic carboxylic acid compounds include aromatic polybasic carboxylic acids such as 1,2,4-benzenetricarboxylic acid (trimellitic acid), 2,5,7-naphthalenetricarboxylic acid and pyromellitic acid, as well as their derivatives such as acid anhydrides and alkyl(C1-3)esters.

The polycarboxylic acid compound used may be a single type alone, or a combination of multiple types.

The polyol component to be used in the crystalline polyester resin of this embodiment includes a C8-12 aliphatic diol, and preferably includes a C8-10 aliphatic diol. The C8-12 aliphatic diol is more preferably a straight-chain aliphatic diol. If the C8-12 aliphatic diol is a branched aliphatic diol, the crystallinity of the polyester resin will tend to be reduced, lowering the melting point (Tm). It will therefore tend to lower the hot offset resistance and storability. If the number of carbon atoms is less than 8, the number of ester groups in the crystalline polyester resin will be too great, tending to make it difficult to ensure a sufficient charge. If the number of carbon atoms is greater than 12, the melting point (Tm) will tend to be too high. The low-temperature fixability and image gloss property will therefore tend to be reduced.

Examples of C8-12 aliphatic diols include 1,8-octanediol, 1,9-nonanediol, 1,10-decanediol, 1,11-undecanediol, 1,12-dodecanediol and the like, with no particular restriction to these. Of these, 1,8-octanediol, 1,9-nonanediol and 1,10-decanediol are preferred from the viewpoint of ready availability. More preferred is 1,9-nonanediol, from the viewpoint of the melting point (Tm) and electrostatic property.

From the viewpoint of the electrostatic property, storability, hot offset resistance and low-temperature fixability, the content of the C8-12 aliphatic diol (content ratio) is preferably such that the number of OH groups from the C8-12 aliphatic diol is at least 90 mol %, and preferably 95 mol %, of the number of OH groups from the polyol component. Two or more different C8-12 aliphatic diols may also be used in combination. From the viewpoint of increasing the crystallinity of the crystalline polyester, the C8-12 aliphatic diol used is more preferably a single type alone.

Examples of other polyol compounds for the polyol component include aromatic diol compounds, C2-7 aliphatic diol compounds and trivalent or greater aromatic polyhydric alcohol compounds, with no particular restriction to these. Examples of C2-7 aliphatic diols include ethylene glycol, 1,2-propylene glycol, 1,3-propylene glycol, 1,4-butanediol, 1,5-pentanediol, 1,6-hexanediol and 1,7-heptanediol. Examples of aromatic polyhydric alcohol compounds include aromatic diols such as alkylene oxide adducts of bisphenol A, represented by the following formula (I), comprising polyoxypropylene adducts of 2,2-bis(4-hydroxyphenyl)propane, polyoxyethylene adducts of 2,2-bis(4-hydroxyphenyl)propane, or the like, and trihydric or greater alcohols such as glycerin, pentaerythritol and trimethylolpropane.

[Chemical Formula 1]

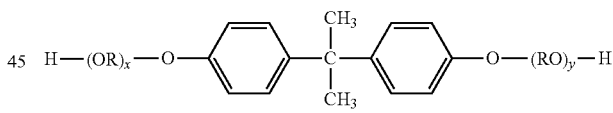

(I)

In the formula, R represents a C2 or C3 alkylene group. The symbols x and y represent positive integers, the sum of x and y being 1 to 16 and preferably 1.5 to 5.

The crystalline polyester resin of this embodiment has an acid value of 5 to 20 mgKOH/g and preferably has an acid value of 10 to 15 mgKOH/g. If the acid value is within this range, the emulsifiability and toner storability of the crystalline polyester resin will be superior when chemical toner is produced. The rate of change of the storage elastic modulus of the crystalline polyester resin, described below, will also be superior. If the acid value is less than 5 mgKOH/g, poor emulsifiability will prevent a uniform particle diameter from being obtained, and ion repulsion between the particles due to electrical charges on the toner surface will tend to be reduced. As a result, the toner will tend to readily undergo coalescence or aggregation upon prolonged exposure to a high-temperature state such as during storage. The storability will therefore tend to be reduced. In addition, since the rate of change of the storage elastic modulus of the storage elastic modulus of the crystalline polyester resin is lowered, it tends to become difficult to obtain a sufficient low-temperature fixability and image gloss property. If the acid value exceeds 20 mgKOH/g, on the other hand, emulsification of the toner will be stable but the particle diameter of the toner will be reduced and the viscosity in the subsequent flocculating step will tend to be increased. This will therefore tend to prevent stable toner particles from being obtained. In addition, this increases the hygroscopicity resulting from ionic functional groups such as carboxyl groups, and tends to lower the blocking resistance. Furthermore, it tends to lower the environmental stability of the toner (that is, the stability of the electrostatic property with changes in temperature or humidity) and cause reduction in image quality due to image formation defects.

The crystalline polyester resin of this embodiment is used in combination with an amorphous polyester resin, for use as a chemical toner via emulsification and flocculating steps. In order to obtain an low-temperature fixability, hot offset resistance, storability and an image gloss property, it is necessary to maintain suitable compatibility between the crystalline polyester resin and the amorphous polyester resin. When the compatibility between the crystalline polyester resin and the amorphous polyester resin is high, the crystalline polyester resin will not easily undergo recrystallization and the image gloss property and storability of the toner will tend to be lowered. If the compatibility is too low, on the other hand, the crystalline polyester resin will exhibit crystallinity, thus tending to increase the fixing temperature.

The crystalline polyester resin of this embodiment has a small gradient of change in the storage elastic modulus with quenching (5° C./min) (described below), and a wide temperature width until crystallization proceeds. This allows suitable control of compatibility or dispersibility with the amorphous polyester resin, so that a low-temperature fixability, hot offset resistance, storability and image gloss property can potentially all be obtained.

The crystalline polyester resin of this embodiment can be obtained by condensation polymerization of a mixture containing a polycarboxylic acid component and a polyol component in the proportion mentioned above. The mixture preferably also includes a monocarboxylic acid such that the ratio of the number of carboxyl groups from the polycarboxylic acid component and the number of carboxyl groups from the monocarboxylic acid is greater than 100:0 and up to 100:5, and more preferably such that the ratio is 100:1 to 100:3. Stated differently, the mixture further includes a monocarboxylic acid in such a range that the proportion of the number of carboxyl groups from the monocarboxylic acid is no greater than 5% and more preferably in the range of 1 to 3%, based on the number of carboxyl groups from the polycarboxylic acid component. This will make it possible to minimize lowering of the melting point.

In the case of a crystalline polyester resin, some degree of correlation is usually found between the weight-average molecular weight and the melting point, with the melting point tending to be lower with a lower weight-average molecular weight.

According to this embodiment, however, reaction together with a monocarboxylic acid can lower the melting point (Tm) even if the weight-average molecular weight (Mw) is adjusted toward the high-molecular-weight end. It was found that this further improves the low-temperature fixability and storability. If the number of carboxyl groups from the monocarboxylic acid is greater than this range, the melting point will be excessively lowered, tending to lower the offset resistance and storability.

Examples of monocarboxylic acids to be used in the crystalline polyester resin of this embodiment include aliphatic monocarboxylic acid compounds such as capric acid, lauric acid, myristic acid, palmitic acid, margaric acid and stearic acid, cyclohexanecarboxylic acids, aromatic monocarboxylic acid compounds such as benzoic acid, methylbenzoic acid, phenoxyacetic acid, phenylpropionic acid, naphthalenecarboxylic acid and naphthoic acid, as well as their acid anhydrides and their lower alkyl (preferably C1-3) esters and the like. The monocarboxylic acid is not particularly restricted to these, but is preferably a C8-18 aliphatic monocarboxylic acid. From the viewpoint of the electrostatic property, a C10-12 aliphatic monocarboxylic acid is more preferred as it has a number of carbon atoms closer to the monomer (C8-12 aliphatic dicarboxylic acid or C8-12 aliphatic diol) that is the main component of the crystalline polyester resin. If the number of carbon atoms of the monocarboxylic acid is greater than 18 the melting point (Tm) will notably increase, tending to lower the low-temperature fixability. If the number of carbon atoms of the monocarboxylic acid is less than 8 the electrostatic property will be reduced, and the resulting crystalline polyester resin and toner will tend to have a stronger undesirable odor.

The method for producing a crystalline polyester resin according to this embodiment is conducted by condensation polymerization reaction between the polyol component and the polycarboxylic acid component. The method for producing a crystalline polyester resin according to this embodiment can be carried out, for example, in an inert gas atmosphere in the presence of an esterification catalyst as mentioned below, such as a tin compound or titanium compound. The condensation polymerization reaction is preferably carried out under a pressure of 50 kPa or greater, more preferably it is carried out under a pressure in the range of 80-105 kPa, and most preferably it is carried out as an ordinary pressure reaction (96-103 kPa). Even with reduced pressure reaction as is common, it may be carried out without affecting change in the storage elastic modulus of the resulting crystalline polyester resin. When a commonly employed reduced pressure reaction is to be used, a large amount of alcohol distills out together with the distillate (mainly water). Therefore, the ratio of the number of COOH groups from the polycarboxylic acid component and the number of OH groups from the polyol component varies, tending to make it difficult to obtain the storage elastic modulus behavior described below for the crystalline polyester resin. This tends to affect the low-temperature fixability and storability of the toner as well.

The reaction temperature conditions are not particularly restricted, but 150° C. to 250° C. is preferred and 180° C. to 230° C. is more preferred. If the reaction temperature is below 150° C., the reaction time will be long and it will tend to be difficult to achieve the target weight-average molecular weight. If the reaction temperature exceeds 250° C., the reaction time will be shortened but large amounts of alcohol will tend to be included in the distillate. This will also tend to affect the low-temperature fixability and storability of the toner. The temperature-elevating rate or temperature elevation curve for the reaction temperature can be adjusted as appropriate. In order to minimize distillation of alcohol into the distillate, the temperature-elevating rate for the reaction temperature is preferably no greater than 3° C./min, and the temperature elevation curve is preferably adjusted in 2 or more stages.

Examples for compounds to be used as catalysts known in the prior art such as esterification catalysts include such transesterification catalysts as antimony trioxide, organic tin-based polymerization catalysts such as dibutyltin oxide, germanium-based catalysts, inorganic titanium-based catalysts, organic titanium-based catalysts, organic cobalt-based catalysts, zinc acetate and manganese acetate. Particularly preferred for use are germanium-based catalysts, inorganic titanium-based catalysts and organic titanium-based catalysts. Organic titanium-based catalysts include titanium alkoxide, titanium potassium oxalate, titanium terephthalate, the catalysts mentioned in Japanese Unexamined Patent Application Publication No. 2006-243715 (titanium dihydroxybis(triethanolaminate), titanium monohydroxytris(triethanolaminate), and their intramolecular condensation products), and the catalysts mentioned in Japanese Unexamined Patent Application Publication No. 2007-113077 (titanium tributoxy terephthalate, titanium triisopropoxy terephthalate and titanium diisopropoxy diterephthalate). Any of these may be used alone or in mixtures of two or more.

The amount of esterification catalyst used is preferably 0.01 to 1.0 part by mass with respect to 100 parts by mass as the total amount of the polyol component and the polycarboxylic acid component, and from the viewpoint of minimizing migration of alcohol into the distillate, it is more preferably 0.03 to 0.5 part by mass.

The crystalline polyester resin of this embodiment preferably has a weight-average molecular weight (Mw) of 5000 to 12000 and more preferably 7000 to 10000. The melting point (Tm) is preferably 65° C. to 75° C. and more preferably 67° C. to 72° C. If the Mw is less than 5000 or the Tm is below 65° C., it will be possible to lower the fixing temperature but it will tend to be difficult to obtain satisfactory offset resistance. That is, permeation of the fused toner into paper has the effect of preventing offset from occurring. However, fused toner tends to penetrate too far into the paper, making it difficult to obtain both a low-temperature fixability and image gloss property. If the Mw exceeds 12000 or the Tm exceeds 75° C., the fixing temperature tends to be higher. The melting point (Tm) is the value measured with a differential scanning calorimeter. The melting point (Tm) indicates the temperature at which the melting endotherm peak is maximum. If the Mw is within this range, it will tend to be easier to obtain a crystalline polyester resin having the desired acid value.

The volume electrical resistance of the crystalline polyester resin of this embodiment is preferably $1.0 \times 10^{12}$ Ω·cm or greater. If it is at least this value, there will be no static inhibition when it is used as a binder resin for toner, and the toner will tend to be satisfactory. If the volume electrical resistance is less than $1.0 \times 10^{12}$ Ω·cm, it will tend to be difficult to ensure sufficient charge when the toner employing the crystalline polyester resin of this embodiment and a carrier are used for frictional electrification.

From the viewpoint of the electrostatic property of the toner, a higher volume electrical resistance is preferred. However, for the crystalline polyester resin of this embodiment, the volume electrical resistance is preferably no greater than $1.0 \times 10^{14}$ Ω·cm. In order to increase it above $1.0 \times 10^{14}$ Ω·cm, it is necessary to increase the content of compounds with more than 12 carbon atoms, or increase the number of carbon atoms, in the polycarboxylic acid component or polyol component. In this case, the melting point (Tm) of the obtained crystalline polyester resin increases, tending to lower the low-temperature fixability. Consequently, in order to obtain a sufficient electrostatic property and low-temperature fixability, the volume electrical resistance of the crystalline polyester resin is preferably in the range specified above.

The crystalline polyester resin of this embodiment preferably has a resin color tone (b* value) of no higher than 2.0. If the b* value exceeds 2.0, the resin color tone will be more strongly yellow, tending to lower the color reproducibility. The resin color tone (b* value) can be adjusted by the ratio between the polycarboxylic acid component and the polyol component (polyCOOH:OH reaction ratio), the reaction temperature and the reaction time.

The crystalline polyester resin of this embodiment produces variation in the recrystallization behavior exhibited by the temperature-lowering rate (cooling rate) and storage elastic modulus, by controlling the condensation polymerization reaction under the conditions described above. Specifically, the gradient of change in the storage elastic modulus with quenching (cooling at 5° C./min) is reduced (in other words, the increase in storage elastic modulus is more gentle) compared to the gradient of change in the storage elastic modulus with gradual cooling (cooling at 1° C./min), and the temperature width in which crystallization proceeds is increased.

FIG. 1 is a semilogarithmic graph schematically showing the relationship between temperature and storage elastic modulus, when the storage elastic modulus of the crystalline polyester resin of this embodiment is measured at cooling rates of 5° C./min and 1° C./min, respectively. This graph plots the storage elastic modulus (Pa) of the crystalline polyester resin on the ordinate (logarithmic scale) and the temperature (° C.) of the crystalline polyester resin on the abscissa. The curve L5 is a variation curve for the storage elastic modulus as measured with a cooling rate of 5° C./min. The curve L1 is a variation curve for the storage elastic modulus as measured with a cooling rate of 1° C./min. For curve L5, the temperatures at which storage elastic moduli of 1000 Pa, 10 Pa and 1 Pa are exhibited are $Ta_5$, $Tb_5$ and $Tc_5$, respectively. For curve L1, the temperatures at which storage elastic moduli of 1000 Pa, 10 Pa and 1 Pa are exhibited are $Ta_1$, $Tb_1$ and $Tc_1$, respectively. This will now be explained with reference to the graph.

Preferably for the crystalline polyester resin of this embodiment, the temperature of the crystalline polyester resin is 57° C. to 63° C. when the storage elastic modulus of the crystalline polyester resin is 1000 Pa to 1 Pa as measured at a cooling rate of 5° C./min, and the temperature of the crystalline polyester resin is 58° C. to 65° C. when the storage elastic modulus of the crystalline polyester resin is 1000 Pa to 1 Pa as measured at a cooling rate of 1° C./min. When this temperature is below 57° C. with a cooling rate of 5° C./min and the temperature is below 58° C. when the cooling rate is 1° C./min, it is possible to lower the fixing temperature but it tends to be difficult to obtain sufficient offset resistance. That is, fused toner tends to penetrate too far into the paper, making it difficult to obtain both a low-temperature fixability and image gloss property. When the temperature is above 63° C. with a cooling rate of 5° C./min and the temperature is above 65° C. with a cooling rate of 1° C./min, the fixing temperature tends to be increased.

Stated differently, with the crystalline polyester resin of this embodiment, the temperature of the crystalline polyester resin is preferably 57° C. to 61° C. when the storage elastic modulus of the crystalline polyester resin is 1000 Pa as measured at a cooling rate of 5° C./min. With the crystalline polyester resin described above, the temperature of the crystalline polyester resin is preferably 58° C. to 63° C. when the storage elastic modulus of the crystalline polyester resin is 1 Pa as measured at a cooling rate of 5° C./min. With the crystalline polyester resin described above, the temperature of the crystalline polyester resin is preferably 58° C. to 63° C. when the storage elastic modulus of the crystalline polyester resin is 1000 Pa as measured at a cooling rate of 1° C./min. With the crystalline polyester resin described above, the temperature of the crystalline polyester resin is preferably 59° C. to 65° C. when the storage elastic modulus of the crystalline polyester resin is 1 Pa as measured at a cooling rate of 1° C./min.

The crystalline polyester resin of this embodiment is used in combination with an amorphous polyester resin, for use as a chemical toner via emulsification and flocculating steps. In curves L5 and L1 shown in FIG. 1, preferably the rate of change D defined by formula (1) below is 1.3 to 4.0, the rate of change E defined by formula (2) below is 1.4 to 4.0, and the rate of change F defined by formula (3) below is 1.4 to 3.0. By satisfying these conditions, compatibility and dispersibility between the crystalline polyester resin and the amorphous polyester resin are satisfactory. This will result in a more superior low-temperature fixability, hot offset resistance, storability and image gloss property being exhibited together. In the formula, Log represents the common logarithm. When calculating the rates of change D, E and F, the parameters representing temperature ($Ta_5$, $Tb_5$, $Tc_5$, $Ta_1$, $Tb_1$ and $Tc_1$) are preferably values with 3 significant digits. Also, the determined rates of change D, E and F are preferably represented by values with 3 significant digits.

[Mathematical Formula 2]

$$D = \frac{(\text{Log}10 - \text{Log}10^3)/(Tb_5 - Ta_5)}{(\text{Log}1 - \text{Log}10)/(Tc_5 - Tb_5)} \quad (1)$$

$$E = \frac{(\text{Log}1 - \text{Log}10)/(Tc_1 - Tb_1)}{(\text{Log}1 - \text{Log}10)/(Tc_5 - Tb_5)} \quad (2)$$

$$F = \frac{(\text{Log}10 - \text{Log}10^3)/(Tb_1 - Ta_1)}{(\text{Log}10 - \text{Log}10^3)/(Tb_5 - Ta_5)} \quad (3)$$

The rate of change D is the ratio of the average gradient from $Ta_5$ to $Tb_5$ and the average gradient from $Tb_5$ to $Tc_5$, for curve L5. The rate of change D depends on the ratio between the number of COOH groups from the polycarboxylic acid component and the number of OH groups from the polyol component. The rate of change D tends to increase with more of the polyol component. When the ratio between the number of COOH groups from the polycarboxylic acid component and the number of OH groups from the polyol component is 100:100, no change is seen in the storage elastic modulus between gradual cooling and quenching, and the rate of change D approaches 1. In other words, this suggests that a crystalline polyester resin with essentially a single composition was obtained.

The rate of change E is the ratio of the average gradient from $Tb_1$ to $Tc_1$ for curve L1 and the average gradient from $Tb_5$ to $Tc_5$, for curve L5. The rate of change F is the ratio of the average gradient from $Ta_1$ to $Tb_1$ for curve L1 and the average gradient from $Ta_5$ to $Tb_5$, for curve L5. The rates of change E and F depend on the ratio between the number of COOH groups from the polycarboxylic acid component and the number of OH groups from the polyol component. The rates of change tend to increase with more polyol.

When the rate of change D is less than 1.3 and the rates of change E and F are less than 1.4, the low-temperature fixability and image gloss property tend to be reduced. The present inventors believe that compatibility and dispersibility with the amorphous polyester resin is reduced because the temperature width in which crystallization of the crystalline polyester resin proceeds is narrowed.

When the rates of change D and E are greater than 4.0 and the rate of change F is greater than 3.0, the hot offset resistance and storability tend to be reduced. The present inventors believe that crystallization of the crystalline polyester resin fails to proceed and performance is lowered because of generation of large amounts of unreacted alcohol and low-molecular-weight oligomers. The obtained toner also tends to generate undesirable odor.

The crystalline polyester resin produced in the manner described above may be used directly as a binder resin for toner. The crystalline polyester resin produced in this manner may also be used as a binder resin for toner in combination with a conventionally known amorphous polyester resin such as polystyrene, styrene/butadiene-based polymer, styrene/acrylic polymer or polyester. According to this embodiment it is possible to provide a binder resin for toner comprising the crystalline polyester resin. The binder resin for toner may be suitably used for electrostatic charge image development.

<<Amorphous Polyester Resin>>

The aforementioned amorphous polyester resins that can be used in combination with crystalline polyester resins (hereunder also referred to simply as "amorphous resins") are preferably condensation polymerized polyester resins obtained by condensation polymerization of an alcohol component and a carboxylic acid component.

Examples of alcohol components include such divalent alcohols as bisphenol A alkylene (C2-4) oxide adducts (mean number moles of addition: 2-5), such as polyoxypropylene (2.2)-2,2-bis(4-hydroxyphenyl)propane, polyoxyethylene (2.2)-2,2-bis(4-hydroxyphenyl)propane, ethylene glycol, propylene glycol, neopentyl glycol, 1,4-butanediol, 1,3-butanediol and 1,6-hexanediol.

Examples of trivalent and greater alcohols include sorbitol, pentaerythritol, glycerol and trimethylolpropane.

The alcohol component of an amorphous resin is preferably an alkylene oxide adduct of bisphenol A, among the aforementioned starting monomers, for improved storage stability. The total content of the alkylene oxide adduct of bisphenol A is preferably 50 mol % or greater and more preferably 60 mol % or greater in the alcohol component. The form of addition of bisphenol A may be simple addition of one type of alkylene oxide, or it may be addition of a combination of two or more different alkylene oxides. From the viewpoint of adjusting the glass transition point of the amorphous polyester resin, it is particularly preferred to use an ethylene oxide adduct and a propylene oxide adduct of bisphenol A in combination. The proportion used in such a case is preferably (ethylene oxide adduct):(propylene oxide adduct) (molar ratio)=10:90 to 50:50.

Examples of carboxylic acid components include aromatic dicarboxylic acids, for example, phthalic acid, isophthalic acid, terephthalic acid, naphthalene-2,6-dicarboxylic acid, dibasic acids such as malonic acid and mesaconic acid, straight-chain or branched aliphatic polybasic carboxylic acids such as oxalic acid, malonic acid, succinic acid, maleic acid, glutaric acid, adipic acid, pimelic acid, suberic acid, azelaic acid, sebacic acid, dodecanedioic acid, 2-ethylhexylsuccinic acid, oleylsuccinic acid, 2-dodecenylsuccinic acid and tetrapropenylsuccinic acid, alicyclic dicarboxylic acids such as 1,2-cyclohexanedicarboxylic acid, 1,3-cyclohexanedicarboxylic acid, 3-methyl-1,2-cyclohexanedicarboxylic acid, 4-methyl-1,2-cyclohexanedicarboxylic acid, 3-ethyl-1,2-cyclohexanedicarboxylic acid, 3-propyl-1,2-cyclohexanedicarboxylic acid, 3-butyl-1,2-cyclohexanedicarboxylic acid and cyclohexenedicarboxylic acids such as 3-cyclohexene-1,2-dicarboxylic acid, dimer acids obtained by dimerization of fatty acids having unsaturated bonds, such as oleic acid and tall oil fatty acids, as well as their acid anhydrides and lower alkyl (preferably C1-3) esters. Examples of trivalent or greater poly carboxylic acid compounds include aromatic carboxylic acids such as 1,2,4-benzenetricarboxylic acid (trimellitic acid), 2,5,7-naphthalenetricarboxylic acid and pyromellitic acid, as well as their derivatives such as acid anhydrides and alkyl(C1-3) esters. These may be used alone or in combinations of two or more.

The carboxylic acid component of an amorphous resin preferably includes an aromatic dicarboxylic acid compound and more preferably includes a terephthalic acid compound, among the aforementioned starting monomers, from the viewpoint of increasing the pressurized storage stability of the toner. An amorphous resin obtained using a terephthalic acid compound as the carboxylic acid component and an amorphous resin obtained without using a terephthalic acid compound may also be prepared and used in combination. Aromatic dicarboxylic acid compounds include those mentioned above for the crystalline polyester. When an aromatic dicarboxylic acid compound is included, the content is preferably at least 60 mol % in the carboxylic acid component. When a trivalent or greater poly carboxylic acid compound is included, the content is preferably 2 to 30 mol % in the carboxylic acid component.

For the amorphous resin described above, the softening point is most preferably 90° C. to 160° C. The glass transition point is most preferably 50° C. to 80° C. The number-average molecular weight is most preferably 2000 to 10000. The weight-average molecular weight is most preferably 10000 to 150000. The acid value is most preferably 4 to 30 mgKOH/g. The hydroxyl value is most preferably 5 to 30 mgKOH/g.

<Binder Resin Dispersion for Toner>

There are no particular restrictions on components other than the binder resin in the toner containing the polyester resin of this embodiment, and they may be selected as appropriate for the purpose. Examples include publicly known components, which include coloring agents such as pigments, inorganic fine particles, organic fine particles, charge controllers, release agents and the like.

The crystalline polyester resin of this embodiment may be used as a binder resin dispersion for toner (dispersion) obtained by dispersion or emulsification in an aqueous medium. The aqueous medium may be water, a solvent that is miscible with water for example, a C1-4 lower alcohol (for example, 2-propyl alcohol) or glycol, or a mixed solvent comprising water and a ketone such as methyl ethyl ketone or acetone. Examples for the method of dispersion or the method of emulsification include methods employing a media disperser (bead mill) or high pressure disperser (homogenizer or Ultimizer), and methods of reverse phase emulsification in which water is added to a solution of the crystalline polyester resin dissolved in an organic solvent, for phase reversion from an oil phase to an aqueous phase.

When the crystalline polyester resin of this embodiment is used as a binder resin for production of a toner, the method employed may be a method for producing chemical toner, such as a kneading pulverizing method, spray drying method, emulsifying aggregation method or the like. The components used for toner production may also be publicly known components. An emulsifying aggregation method is preferred to reduce the fine particle diameter of the toner and control the particle size distribution. The crystalline polyester resin of this embodiment is suitable for preparing a binder resin dispersion for toner as described above, and it can be suitably used in an emulsifying aggregation method.

For this embodiment, an antioxidant may also be added to the crystalline polyester resin to prevent coloration or thermal decomposition. Such antioxidants are not particularly restricted, and examples include hindered phenol-based antioxidants, phosphite-based antioxidants and sulfur-containing antioxidants.

EXAMPLES

The invention will now be described in greater detail by examples, with the understanding that the invention is not limited thereto. The evaluations in the examples were carried out by the following methods.

(1) Acid Value

The acid value was determined according to the neutralization titration method of JIS K 0070(1992) 3.1. The measuring solvent used was a mixed solvent of tetrahydrofuran:water=10:1 (volume ratio). A sample of the crystalline polyester resin (1 g) was dissolved in the mixed solvent (60 mL) for measurement. The measuring device used was an AUTO TITRATOR COM-1700 (by Hiranuma).

(2) Melting Point

A DSC-6220 differential scanning calorimeter (product of SII NanoTechnology Inc.) was used as the measuring apparatus, and the melting point of the crystalline polyester resin was measured under the following conditions. In a graph of measurement data with heat flow plotted on the ordinate and measuring temperature plotted on the abscissa, the temperature at the maximum melting endotherm peak appearing during the second temperature increase was recorded as the melting point of the crystalline polyester resin.

DSC Measuring Conditions
Temperature-elevating rate and temperature-lowering rate: 10° C./min
Temperature-elevating program: Temperature increase from room temperature to 150° C., followed by holding at 150° C. for 1 minute. This was followed by temperature decrease to 0° C., holding at 0° C. for 1 minute and further temperature increase to 150° C.
Measuring atmosphere: nitrogen stream (flow rate: 50 mL/min)
Cell used: Hermetically sealed aluminum
Sample amount: 5 mg (3) Weight-Average Molecular Weight (Mw)

The weight-average molecular weight (Mw) of the crystalline polyester resin was measured by the following method. The crystalline polyester resin (2 mg) was added to tetrahydrofuran (2 mL) and mixed therewith. The tetrahydrofuran solubilized portion of the obtained liquid mixture was analyzed by gel permeation chromatography (GPC), and the Mw of the crystalline polyester resin was calculated in terms of polystyrene. The proportion of components with Mw of 500 and lower was calculated by the area ratio of the detected peak.

GPC Measuring Conditions
Measuring apparatus: HLC-8320GPC (trade name of Tosoh Corp.)
Detector: RI detector (detector accessory of HLC-8320GPC)
Mobile phase: Tetrahydrofuran
Column: There were used two TSKgel superMultipore HZ-M columns (product of Tosoh Corp.) and one TSKgel superMultipore HZ-H column (product of Tosoh Corp.), connected in series.

Sample injector and column temperature: 40° C.
RI detector temperature: 35° C.
Sample injection rate: 5 μL
Flow rate: 0.35 mL/min
Measuring time: 20 minutes (4) Glass Transition Point The glass transition point of the crystalline polyester resin was measured according to JIS K7121(1987) 9.3(3). A DSC-6220 differential scanning calorimeter (product of SII NanoTechnology Inc.) was used as the measuring apparatus, and measurement was conducted under the following conditions. On a graph of the measurement data plotting heat flow on the ordinate and measuring temperature on the abscissa, the glass transition point was defined as the temperature at the intersection between a straight line extending the low-temperature end baseline toward the high-temperature end baseline, and the tangent line at the point where the slope of the curve is maximum at the portion where the glass transition varies in a step-wise manner, and the glass transition point appearing during the second temperature increase was used as the glass transition point of the crystalline polyester resin.

DSC Measuring Conditions

Temperature-elevating rate and temperature-lowering rate: 10° C./min

Temperature-elevating program: Temperature increase from room temperature to 150° C., followed by holding at 150° C. for 1 minute. This was followed by temperature decrease to 0° C., holding at 0° C. for 1 minute and further temperature increase to 150° C.

Measuring atmosphere: nitrogen stream (flow rate: 50 mL/min)

Cell used: Hermetically sealed aluminum

Sample amount: 5 mg (5) Storage Elastic Modulus

The storage elastic modulus of the crystalline polyester resin was measured using an ARES-G2 dynamic viscoelasticity measuring apparatus (product of TA Instruments). A finely milled crystalline polyester resin was anchored between parallel plates. The anchored crystalline polyester was subjected to distortion at one end by twisting reciprocal vibration at an oscillation frequency of 6.28 rad/sec, and the stress produced by the distortion at the other end was detected. The temperature was gradually decreased from 80° C. to 50° C. in this state, and the temperature dependence of viscoelasticity was measured.

Measuring conditions for storage elastic modulus

Oscillation frequency: 6.28 rad/sec

Measuring temperature: 80° C. to 50° C.

Measuring GAP: 15 mm

Parallel plates: ϕ50 mm

Strain: 10%

Temperature-lowering rate: 1° C./min or 5° C./min

Oscillation setting: Fast Sampling (6) Volume Electrical Resistance

The volume electrical resistance of the crystalline polyester resin was determined in the following manner. First, the crystalline polyester resin (10 g) was weighed out into a circular die with a diameter of about 5 cm. A plate kept parallel to the floor was set in a dryer with an atmosphere of 150° C. The circular die was allowed to stand on the set plate for about 20 minutes of hot melting. The circular die was then removed, and allowed to cool to solidification for about 30 minutes in an atmosphere of 20° C.×65% RH. After cooling solidification of the crystalline polyester resin, a disc sample with a thickness of about 3 mm and a diameter of about 5 cm was obtained. Next, humidification was carried out for 24 hours under conditions of 20° C.×65% RH. The disc sample was then placed on a conduction disc of a ring electrode BOX connected to a Model SM-5E Super Megohm Meter (product of DKK-Toa Corporation). The volume electrical resistance was calculated by the following formula, based on the value read for the resistance value upon application of a 500 V voltage to the disc sample sandwiched between probes, and the previously measured thickness of the disc sample.

Volume electrical resistance=$2.01 \times Rv$ (read resistance value)/$t$ (thickness of disc sample (mm))

(7) Resin Color Tone (b* Value)

The b* value of the crystalline polyester resin was measured using a CM-3700d SPECTROPHOTOMETER (trade name of Minolta). The light source used was a D65 (color temperature: 6504K), and measurement was performed in a 10° visual field.

(8) Particle Size Distribution

The volume-average particle diameter (D50v) and volume particle diameter distribution index (GSDv) of the resin particles in the crystalline polyester resin dispersion were measured in the following manner using a laser diffraction particle size distribution analyzer (LA-920, trade name of Horiba, Ltd.). A sample of a dispersion of crystalline polyester resin particles (solvent: water) was introduced into a cell to an appropriate concentration, and allowed to stand for approximately 2 minutes. When the concentration of resin particles in the cell subsequently stabilized, the mean particle diameter of the resin particles was measured. The volume-average particle diameter for each obtained channel was cumulated in order from the smaller volume-average particle diameters, and the particle diameter with a 50 vol % cumulative volume was recorded as the volume-average particle diameter (D50v).

—Production of Crystalline Polyester Resin—

Production of a crystalline polyester resin was carried out using one of the following five production processes.

Production Process A

The starting materials listed in Table 1 or Table 2 were charged into a reactor that had been sufficiently dried beforehand, and heated to 120° C. while stirring with nitrogen aeration. Next, 0.05 part by mole of n-tetrabutoxytitanium was charged into the reactor as a catalyst, and the temperature was raised to the reaction temperature listed in Table 1 or Table 2. The starting materials were subjected to polycondensation reaction at the reaction temperature listed in Table 1 or Table 2, to obtain a crystalline polyester resin. The temperature-elevating rate from 120° C. to the reaction temperature was 1° C./min.

Production Process B

The starting materials listed in Table 1 were charged into a reactor that had been sufficiently dried beforehand, and heated to 120° C. while stirring with nitrogen aeration. Next, 0.05 part by mole of n-tetrabutoxytitanium was charged into the reactor as a catalyst. The temperature was then raised to 170° C., and reaction was conducted at 170° C. for 2 hours. The temperature was then raised to the reaction temperature listed in Table 1, and the starting materials were subjected to polycondensation reaction at the reaction temperature to obtain a crystalline polyester resin. The temperature-elevating rate from 120° C. to the reaction temperature was 1° C./min.

Production Process C

The starting materials listed in Table 1 were charged into a reactor that had been sufficiently dried beforehand, and heated to 120° C. while stirring with nitrogen aeration. Next, 0.05 part by mole of n-tetrabutoxytitanium was charged into the reactor as a catalyst. The temperature was then raised to 150° C., and reaction was conducted at 150° C. for 2 hours. The temperature was then raised to the reaction temperature listed in Table 1, and the starting materials were subjected to polycondensation reaction at the reaction temperature to obtain a crystalline polyester resin. The temperature-elevating rate from 120° C. to the reaction temperature was 1° C./min.

Production Process D

The starting materials listed in Table 1 were charged into a reactor that had been sufficiently dried beforehand, and heated to 120° C. while stirring with nitrogen aeration. Next, 0.05 part by mole of n-tetrabutoxytitanium was charged into the reactor as a catalyst, and the temperature was raised to the reaction temperature listed in Table 1. The starting materials were subjected to polycondensation reaction at the reaction temperature, to obtain a crystalline polyester resin. The temperature-elevating rate from 120° C. to the reaction temperature was 3° C./min.

Production Process E

The starting materials listed in Table 2 were charged into a reactor that had been sufficiently dried beforehand, and heated to 120° C. while stirring with nitrogen aeration. Next, 0.05 part by mole of n-tetrabutoxytitanium was charged into the reactor as a catalyst. The temperature was then raised to the reaction temperature listed in Table 2, and the starting materials were subjected to polycondensation reaction at the reaction temperature with pressure reduction to 2 kPa, to obtain a crystalline polyester resin. The temperature-elevating rate from 120° C. to the reaction temperature was 1° C./min.

Synthesis examples of crystalline polyester resins corresponding to examples and comparative examples are described below.

Example 1

Production Process A

Into a thoroughly pre-dried reactor there were charged 1,9-nonanediol (108 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 3 hours to obtain a crystalline polyester resin (A-1). The physical properties of the resin were as follows. The weight-average molecular weight was 8000, the acid value was 19.1 mgKOH/g and the melting point was 69.7° C. The volume electrical resistance was $8.9 \times 10^{12}$ Ω·cm and the b* value was 1.89. The rates of change in the storage elastic modulus were D=1.33, E=2.00 and F=1.50.

Example 2

Production Process A

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 3 hours to obtain a crystalline polyester resin (A-2). The physical properties of the resin were as follows. The weight-average molecular weight was 6500, the acid value was 12.6 mgKOH/g and the melting point was 68.6° C. The volume electrical resistance was $7.6 \times 10^{12}$ Ω·cm and the b* value was 1.72. The rates of change in the storage elastic modulus were D=2.00, E=3.00 and F=1.50.

Example 3

Production Process A

Into a thoroughly pre-dried reactor there were charged 1,9-nonanediol (118 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 3 hours to obtain a crystalline polyester resin (A-3). The physical properties of the resin were as follows. The weight-average molecular weight was 5100, the acid value was 15.9 mgKOH/g and the melting point was 67.0° C. The volume electrical resistance was $7.4 \times 10^{12}$ Ω·cm and the b* value was 1.52. The rates of change in the storage elastic modulus were D=2.80, E=3.50 and F=2.50.

Example 4

Production Process A

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 230° C. at a temperature-elevating rate of 1° C./min. Next, the reaction mixture was subjected to polycondensation reaction at 230° C. for 3 hours to obtain a crystalline polyester resin (A-4). The physical properties of the resin were as follows. The weight-average molecular weight was 10000, the acid value was 5.1 mgKOH/g and the melting point was 71.2° C. The volume electrical resistance was $2.8 \times 10^{13}$ Ω·cm and the b* value was 1.85. The rates of change in the storage elastic modulus were D=1.33, E=4.00 and F=1.50.

Example 5

Production Process A

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 1.5 hours to obtain a crystalline polyester resin (A-5). The physical properties of the resin were as follows. The weight-average molecular weight was 5500, the acid value was 18.3 mgKOH/g and the melting point was 67.9° C. The volume electrical resistance was $6.5 \times 10^{12}$ Ω·cm and the b* value was 1.66. The rates of change in the storage elastic modulus were D=2.00, E=2.50 and F=1.67.

Example 6

Production Process A

Into a thoroughly pre-dried reactor there were charged 1,12-dodecanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 3 hours to obtain a crystalline polyester resin (A-6). The physical properties of the resin were as follows. The weight-average molecular weight was 7000, the acid value was 19.0 mgKOH/g and the melting point was 70.7° C. The volume electrical resistance was $7.1 \times 10^{13}$ Ω·cm and the b* value was 1.73. The rates of change in the storage elastic modulus were D=2.00, E=3.00 and F=2.00.

Example 7

Production Process A

Into a thoroughly pre-dried reactor there were charged 1,8-octanediol (112 parts by mole) and 1,8-octanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 4 hours to obtain a crystalline polyester resin (A-7). The physical properties of the resin were as follows. The weight-average molecular weight was 7100, the acid value was 13.0 mgKOH/g and the melting point was 67.5° C. The volume electrical resistance was $2.4 \times 10^{12}$ Ω·cm and the b* value was 1.74. The rates of change in the storage elastic modulus were D=2.00, E=3.00 and F=1.50.

Example 8

Production Process A

Into a thoroughly pre-dried reactor there were charged 1,9-nonanediol (112 parts by mole), 1,12-dodecanedioic acid (100 parts by mole) and lauric acid (6 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 4 hours to obtain a crystalline polyester resin (A-8). The physical properties of the resin were as follows. The weight-average molecular weight was 7000, the acid value was 14.5 mgKOH/g and the melting point was 68.7° C. The volume electrical resistance was $2.9 \times 10^{13}$ Ω·cm and the b* value was 1.69. The rates of change in the storage elastic modulus were D=2.33, E=3.50 and F=2.00.

Example 9

Production Process A

Into a thoroughly pre-dried reactor there were charged 1,6-hexanediol (6 parts by mole), 1,9-nonanediol (106 parts by mole), hexanedioic acid (5 parts by mole) and 1,12-dodecanedioic acid (95 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 3 hours to obtain a crystalline polyester resin (A-9). The physical properties of the resin were as follows. The weight-average molecular weight was 6400, the acid value was 12.5 mgKOH/g and the melting point was 67.4° C. The volume electrical resistance was $5.4 \times 10^{12}$ Ω·cm and the b* value was 1.77. The rates of change in the storage elastic modulus were D=2.40, E=3.00 and F=1.67.

Example 10

Production Process B

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 170° C. at a temperature-elevating rate of 1° C./min, for reaction at 170° C. for 2 hours. Next, the temperature was raised to 210° C. at a temperature-elevating rate of 1° C./min, and the reaction mixture was subjected to polycondensation reaction for 3 hours to obtain a crystalline polyester resin (A-10). The physical properties of the resin were as follows. The weight-average molecular weight was 6600, the acid value was 13.4 mgKOH/g and the melting point was 68.7° C. The volume electrical resistance was $7.5 \times 10^{12}$ Ω·cm and the b* value was 1.70. The rates of change in the storage elastic modulus were D=2.00, E=3.00 and F=1.50.

Example 11

Production Process C

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 150° C. at a temperature-elevating rate of 1° C./min, for reaction at 150° C. for 2 hours. Next, the temperature was raised to 210° C. at a temperature-elevating rate of 1° C./min, and the reaction mixture was subjected to polycondensation reaction at 210° C. for 3 hours to obtain a crystalline polyester resin (A-11). The physical properties of the resin were as follows. The weight-average molecular weight was 6400, the acid value was 14.2 mgKOH/g and the melting point was 68.6° C. The volume electrical resistance was $7.9 \times 10^{12}$ Ω·cm and the b* value was 1.87. The rates of change in the storage elastic modulus were D=2.00, E=3.00 and F=1.50.

Example 12

Production Process D

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 3° C./min. Next, the reaction mixture was subjected to polycondensation reaction at 210° C. for 3 hours to obtain a crystalline polyester resin (A-12). The physical properties of the resin were as follows. The weight-average molecular weight was 6700, the acid value was 16.4 mgKOH/g and the melting point was 68.7° C. The volume electrical resistance was $6.5 \times 10^{12}$ Ω·cm and the b* value was 1.78. The rates of change in the storage elastic modulus were D=2.40, E=3.00 and F=1.67.

Example 13

Production Process A

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 240° C. at a temperature-elevating rate of 1° C./min. Next, the reaction mixture was subjected to polycondensation reaction at 240° C. for 1 hour to obtain a crystalline polyester resin (A-13). The physical properties of the resin were as follows. The weight-average molecular weight was 6600, the acid value was 16.2 mgKOH/g and the melting point was 68.7° C. The volume electrical resistance was $8.3 \times 10^{12}$ Ω·cm and the b* value was 1.71. The rates of change in the storage elastic modulus were D=2.40, E=3.00 and F=1.67.

Example 14

Production Process A

Into a thoroughly pre-dried reactor there were charged 1,8-octanediol (112 parts by mole), 1,8-octanedioic acid (100 parts by mole) and lauric acid (20 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 1 hour to obtain a crystalline polyester resin (A-14). The physical properties of the resin were as follows. The weight-average molecular weight was 5600, the acid value was 16.2 mgKOH/g and the melting point was 64.5° C. The volume electrical resistance was $8.5 \times 10^{12}$ Ω·cm and the b* value was 1.87. The rates of change in the storage elastic modulus were D=2.00, E=3.00 and F=1.50.

Comparative Example 1

Production Process A

Into a thoroughly pre-dried reactor there were charged 1,9-nonanediol (122 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 3 hours to obtain a crystalline polyester resin (B-1). The physical properties of the resin were as follows. The weight-average molecular weight was 5100, the acid value was 9.0 mgKOH/g and the melting point was 66.5° C. The volume electrical resistance was $7.2 \times 10^{12}$ Ω·cm and the b* value was 1.54. The rates of change in the storage elastic modulus were D=4.00, E=5.00 and F=2.50.

Comparative Example 2

Production Process A

Into a thoroughly pre-dried reactor there were charged 1,9-nonanediol (100 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 1 hour to obtain a crystalline polyester resin (B-2). The physical properties of the resin were as follows. The weight-average molecular weight was 5100, the acid value was 39.6 mgKOH/g and the melting point was 68.8° C. The volume electrical resistance was $8.2 \times 10^{12}$ Ω·cm and the b* value was 2.09. The rates of change in the storage elastic modulus were D=0.75, E=1.00 and F=1.33.

Comparative Example 3

Production Process A

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 1 hour to obtain a crystalline polyester resin (B-3). The physical properties of the resin were as follows. The weight-average molecular weight was 3000, the acid value was 41.0 mgKOH/g and the melting point was 64.7° C. The volume electrical resistance was $5.2 \times 10^{12}$ Ω·cm and the b* value was 1.65. The rates of change in the storage elastic modulus were D=2.00, E=3.00 and F=2.00.

Comparative Example 4

Production Process A

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 230° C. at a temperature-elevating rate of 1° C./min. Next, the reaction mixture was subjected to polycondensation reaction at 230° C. for 10 hours to obtain a crystalline polyester resin (B-4).

The physical properties of the resin were as follows. The weight-average molecular weight was 13200, the acid value was 2.0 mgKOH/g and the melting point was 75.1° C. The volume electrical resistance was $9.5 \times 10^{12}$ Ω·cm and the b* value was 1.83. The rates of change in the storage elastic modulus were D=1.43, E=1.25 and F=1.75.

Comparative Example 5

Production Process A

Into a thoroughly pre-dried reactor there were charged 1,14-tetradecanediol (112 parts by mole) and 1,14-tetradecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 3 hours to obtain a crystalline polyester resin (B-5). The physical properties of the resin were as follows. The weight-average molecular weight was 6900, the acid value was 18.0 mgKOH/g and the melting point was 75.4° C. The volume electrical resistance was $2.6 \times 10^{14}$ Ω·cm and the b* value was 1.76. The rates of change in the storage elastic modulus were D=2.00, E=2.50 and F=1.67.

Comparative Example 6

Production Process A

Into a thoroughly pre-dried reactor there were charged 1,6-hexanediol (112 parts by mole) and hexanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 4 hours to obtain a crystalline polyester resin (B-6). The physical properties of the resin were as follows. The weight-average molecular weight was 6400, the acid value was 5.2 mgKOH/g and the melting point was 59.5° C. The volume electrical resistance was $2.0 \times 10^{11}$ Ω·cm and the b* value was 1.70. The rates of change in the storage elastic modulus were D=2.00, E=2.50 and F=1.25.

Comparative Example 7

Production Process E

Into a thoroughly pre-dried reactor there were charged 1,9-nonanediol (112 parts by mole) and 1,12-dodecanedioic acid (100 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 1 hour with pressure reduction to 2 kPa, to obtain a crystalline polyester resin (B-7). The physical properties of the resin were as follows. The weight-average molecular weight was 6700, the acid value was 25.6 mgKOH/g and the melting point was 68.7° C. The volume electrical resistance was $9.5 \times 10^{12}$ Ω·cm and the b* value was 1.83. The rates of change in the storage elastic modulus were D=1.33, E=1.00 and F=1.20.

Comparative Example 8

Production Process A

Into a thoroughly pre-dried reactor there were charged 1,6-hexanediol (22 parts by mole), 1,9-nonanediol (90 parts by mole), hexanedioic acid (20 parts by mole) and 1,12-dodecanedioic acid (80 parts by mole), and the mixture was heated to 120° C. while stirring with nitrogen aeration. As a catalyst, n-tetrabutoxytitanium (0.05 part by mole) was charged into the reactor, and the temperature was raised to 210° C. at a temperature-elevating rate of 1° C./min. Next, the reaction mixture was subjected to polycondensation reaction at 210° C. for 3 hours to obtain a crystalline polyester resin (B-8). The physical properties of the resin were as follows. The weight-average molecular weight was 6500, the acid value was 12.0 mgKOH/g and the melting point was 63.6° C. The volume electrical resistance was $8.7 \times 10^{11}$ Ω·cm and the b* value was 1.75. The rates of change in the storage elastic modulus were D=2.40, E=3.00 and F=1.67.

The compositions of the starting materials for the crystalline polyester resins of Examples 1 to 14 and the physical properties of the crystalline polyester resins of Examples 1 to 14 are shown in Table 1.

TABLE 1

| Example<br>Crystalline polyester resin | | | 1<br>A-1 | 2<br>A-2 | 3<br>A-3 | 4<br>A-4 | 5<br>A-5 | 6<br>A-6 | 7<br>A-7 |
|---|---|---|---|---|---|---|---|---|---|
| Starting materials (molar ratio) | Polyol component | 1,6-Hexanediol | — | — | — | — | — | — | — |
| | | 1,8-Octanediol | — | — | — | — | — | — | 112 |
| | | 1,9-Nonanediol | 108 | 112 | 118 | 112 | 112 | — | — |
| | | 1,12-Dodecanediol | — | — | — | — | — | 112 | — |
| | Polycarboxylic acid component | Hexanedioic acid | — | — | — | — | — | — | — |
| | | 1,8-Octanedioic acid | — | — | — | — | — | — | 100 |
| | | 1,12-Dodecanedioic acid | 100 | 100 | 100 | 100 | 100 | 100 | — |
| | | Lauric acid | — | — | — | — | — | — | — |
| | | N-Tetrabutoxytitanium | 0.05 | 0.05 | 0.05 | 0.05 | 0.05 | 0.05 | 0.05 |
| Step | | Production method | A | A | A | A | A | A | A |
| | | Reaction temperature (° C.) | 210 | 210 | 210 | 230 | 210 | 210 | 210 |
| Physical properties | | Weight-average molecular weight (Mw) | 8000 | 6500 | 5100 | 10000 | 5500 | 7000 | 7100 |
| | | Acid value (mgKOH/g) | 19.1 | 12.6 | 15.9 | 5.1 | 18.3 | 19.0 | 13.0 |

TABLE 1-continued

| | | 1 | 2 | 3 | 4 | 5 | 6 | 7 |
|---|---|---|---|---|---|---|---|---|
| Melting point (° C.) | | 69.7 | 68.6 | 67.0 | 71.2 | 67.9 | 70.7 | 67.5 |
| Volume electrical resistance (Ω · cm) | | $8.9 \times 10^{12}$ | $7.6 \times 10^{12}$ | $7.4 \times 10^{12}$ | $2.8 \times 10^{13}$ | $6.5 \times 10^{12}$ | $7.1 \times 10^{13}$ | $2.4 \times 10^{12}$ |
| b* value | | 1.89 | 1.72 | 1.52 | 1.85 | 1.66 | 1.73 | 1.74 |
| $Ta_5$ (° C.) | | 60.8 | 59.0 | 57.8 | 60.9 | 58.0 | 59.5 | 58.0 |
| $Tb_5$ (° C.) | | 61.4 | 59.6 | 58.3 | 61.5 | 58.5 | 60.1 | 58.6 |
| $Tc_5$ (° C.) | | 61.8 | 60.2 | 59.0 | 61.9 | 59.0 | 60.7 | 59.2 |
| Rate of change (D) | | 1.33 | 2.00 | 2.80 | 1.33 | 2.00 | 2.00 | 2.00 |
| $Ta_1$ (° C.) | | 62.5 | 60.3 | 59.2 | 62.6 | 59.3 | 60.9 | 59.3 |
| $Tb_1$ (° C.) | | 62.9 | 60.7 | 59.4 | 63.0 | 59.6 | 61.2 | 59.7 |
| $Tc_1$ (° C.) | | 63.1 | 60.9 | 59.6 | 63.1 | 59.8 | 61.4 | 59.9 |
| Rate of change (E) | | 2.00 | 3.00 | 3.50 | 4.00 | 2.50 | 3.00 | 3.00 |
| Rate of change (F) | | 1.50 | 1.50 | 2.50 | 1.50 | 1.67 | 2.00 | 1.50 |

| | | | 8 | 9 | 10 | 11 | 12 | 13 | 14 |
|---|---|---|---|---|---|---|---|---|---|
| Example | | | | | | | | | |
| Crystalline polyester resin | | | A-8 | A-9 | A-10 | A-11 | A-12 | A-13 | A-14 |
| Starting materials (molar ratio) | Polyol component | 1,6-Hexanediol | — | 6 | — | — | — | — | — |
| | | 1,8-Octanediol | — | — | — | — | — | — | 112 |
| | | 1,9-Nonanediol | 112 | 106 | 112 | 112 | 112 | 112 | — |
| | | 1,12-Dodecanediol | — | — | — | — | — | — | — |
| | Polycarboxylic acid component | Hexanedioic acid | — | 5 | — | — | — | — | — |
| | | 1,8-Octanedioic acid | — | — | — | — | — | — | 100 |
| | | 1,12-Dodecanedioic acid | 100 | 95 | 100 | 100 | 100 | 100 | — |
| | | Lauric acid | 6 | — | — | — | — | — | 20 |
| | | N-Tetrabutoxytitanium | 0.05 | 0.05 | 0.05 | 0.05 | 0.05 | 0.05 | 0.05 |
| Step | | Production method | A | A | B | C | D | A | A |
| | | Reaction temperature (° C.) | 210 | 210 | 210 | 210 | 210 | 240 | 210 |
| Physical properties | | Weight-average molecular weight (Mw) | 7000 | 6400 | 6600 | 6400 | 6700 | 6600 | 5600 |
| | | Acid value (mgKOH/g) | 14.5 | 12.5 | 13.4 | 14.2 | 16.4 | 16.2 | 16.2 |
| | | Melting point (° C.) | 68.7 | 67.4 | 68.7 | 68.6 | 68.7 | 68.7 | 64.5 |
| | | Volume electrical resistance (Ω · cm) | $2.9 \times 10^{13}$ | $5.4 \times 10^{12}$ | $7.5 \times 10^{12}$ | $7.9 \times 10^{12}$ | $6.5 \times 10^{12}$ | $8.3 \times 10^{12}$ | $8.5 \times 10^{12}$ |
| | | b* value | 1.69 | 1.77 | 1.70 | 1.87 | 1.78 | 1.71 | 1.87 |
| | | $Ta_5$ (° C.) | 59.1 | 57.9 | 59.0 | 59.0 | 58.9 | 59.0 | 57.3 |
| | | $Tb_5$ (° C.) | 59.7 | 58.4 | 59.6 | 59.6 | 59.4 | 59.5 | 57.9 |
| | | $Tc_5$ (° C.) | 60.4 | 59.0 | 60.2 | 60.2 | 60.0 | 60.1 | 58.5 |
| | | Rate of change (D) | 2.33 | 2.40 | 2.00 | 2.00 | 2.40 | 2.40 | 2.00 |
| | | $Ta_1$ (° C.) | 60.5 | 59.3 | 60.3 | 60.3 | 60.2 | 60.4 | 58.5 |
| | | $Tb_1$ (° C.) | 60.8 | 59.6 | 60.7 | 60.7 | 60.5 | 60.7 | 58.9 |
| | | $Tc_1$ (° C.) | 61.0 | 59.8 | 60.9 | 60.9 | 60.7 | 60.9 | 59.1 |
| | | Rate of change (E) | 3.50 | 3.00 | 3.00 | 3.00 | 3.00 | 3.00 | 3.00 |
| | | Rate of change (F) | 2.00 | 1.67 | 1.50 | 1.50 | 1.67 | 1.67 | 1.50 |

The compositions of the starting materials for the crystalline polyester resins of Comparative Examples 1 to 8 and the physical properties of the crystalline polyester resins of Comparative Examples 1 to 8 are shown in Table 2.

TABLE 2

| Comp. Ex. | | | 1 | 2 | 3 | 4 | 5 | 6 | 7 | 8 |
|---|---|---|---|---|---|---|---|---|---|---|
| Crystalline polyester resin | | | B-1 | B-2 | B-3 | B-4 | B-5 | B-6 | B-7 | B-8 |
| Starting materials (molar ratio) | Polyol component | 1,6-Hexanediol | — | — | — | — | — | 112 | — | 22 |
| | | 1,8-Octanediol | — | — | — | — | — | — | — | — |
| | | 1,9-Nonanediol | 122 | 100 | 112 | 112 | — | — | 112 | 90 |
| | | 1,12-Dodecanediol | — | — | — | — | — | — | — | — |
| | | 1,14-Tetradecanediol | — | — | — | — | 112 | — | — | — |
| | Polycarboxylic acid component | Hexanedioic acid | — | — | — | — | — | 100 | — | 20 |
| | | 1,8-Octanedioic acid | — | — | — | — | — | — | — | — |
| | | 1,12-Dodecanedioic acid | 100 | 100 | 100 | 100 | — | — | 100 | 80 |
| | | 1,14-Tetradecanedioic acid | — | — | — | — | 100 | — | — | — |
| | | Lauric acid | — | — | — | — | — | — | — | — |
| | | N-Tetrabutoxytitanium | 0.05 | 0.05 | 0.05 | 0.05 | 0.05 | 0.05 | 0.05 | 0.05 |

TABLE 2-continued

| Comp. Ex.<br>Crystalline polyester resin | | 1<br>B-1 | 2<br>B-2 | 3<br>B-3 | 4<br>B-4 | 5<br>B-5 | 6<br>B-6 | 7<br>B-7 | 8<br>B-8 |
|---|---|---|---|---|---|---|---|---|---|
| Step | Production method | A | A | A | A | A | A | E | A |
|  | Reaction temperature (° C.) | 210 | 210 | 210 | 230 | 210 | 210 | 210 | 210 |
|  | Weight-average molecular weight (Mw) | 5100 | 5100 | 3000 | 13200 | 6900 | 6400 | 6700 | 6500 |
|  | Acid value (mgKOH/g) | 9.0 | 39.6 | 41.0 | 2.0 | 18.0 | 5.2 | 25.6 | 12.0 |
|  | Melting point (° C.) | 66.5 | 68.8 | 64.7 | 75.1 | 75.4 | 59.5 | 68.7 | 63.6 |
|  | Volume electrical resistance ($\Omega \cdot cm$) | $7.2 \times 10^{12}$ | $8.2 \times 10^{12}$ | $5.2 \times 10^{12}$ | $9.5 \times 10^{12}$ | $2.6 \times 10^{14}$ | $2.0 \times 10^{11}$ | $9.5 \times 10^{12}$ | $8.7 \times 10^{11}$ |
|  | b* value | 1.54 | 2.09 | 1.65 | 1.83 | 1.76 | 1.70 | 1.83 | 1.75 |
| Physical properties | $Ta_5$ (° C.) | 57.8 | 58.8 | 56.4 | 62.4 | 63.1 | 49.1 | 62.5 | 54.4 |
|  | $Tb_5$ (° C.) | 58.3 | 59.6 | 57.0 | 63.1 | 63.6 | 49.6 | 63.1 | 54.9 |
|  | $Tc_5$ (° C.) | 59.3 | 59.9 | 57.6 | 63.6 | 64.1 | 50.1 | 63.5 | 55.5 |
|  | Rate of change (D) | 4.00 | 0.75 | 2.00 | 1.43 | 2.00 | 2.00 | 1.33 | 2.40 |
|  | $Ta_1$ (° C.) | 59.0 | 59.8 | 57.8 | 64.7 | 64.8 | 50.4 | 64.6 | 55.7 |
|  | $Tb_1$ (° C.) | 59.2 | 60.4 | 58.1 | 65.1 | 65.1 | 50.8 | 65.1 | 56.0 |
|  | $Tc_1$ (° C.) | 59.4 | 60.7 | 58.3 | 65.5 | 65.3 | 51.0 | 65.5 | 56.2 |
|  | Rate of change (E) | 5.00 | 1.00 | 3.00 | 1.25 | 2.50 | 2.50 | 1.00 | 3.00 |
|  | Rate of change (F) | 2.50 | 1.33 | 2.00 | 1.75 | 1.67 | 1.25 | 1.20 | 1.67 |

The crystalline polyester resins obtained in Examples 1 to 14 and Comparative Examples 1 to 8 were used to produce binder resin dispersions for toner and toners. This will be explained in detail below.

—Production of Amorphous Polyester Resin 1—

To a reactor that had been thoroughly dried beforehand there were added a 2.2 molar ethylene oxide adduct of bisphenol A (35 parts by mole), a 2.3 molar propylene oxide adduct of bisphenol A (65 parts by mole), ethylene glycol (88 parts by mole), terephthalic acid (44 parts by mole), dimethyl terephthalate (44 parts by mole), tetrapropenylsuccinic anhydride (8 parts by mole) and trimellitic anhydride (4 parts by mole). The reaction mixture was heated to 180° C. while stirring with nitrogen aeration. As the catalyst, n-tetrabutoxytitanium (0.05 part by mole) was added to the reactor, and the temperature was raised to 250° C. The pressure was then reduced until the pressure inside the reactor finally reached 2 kPa or lower, and polycondensation reaction was conducted at 250° C. for 7 hours. After restoration to ordinary pressure, trimellitic anhydride (2.5 parts by mole) was added to the reactor, and then reaction was conducted at 210° C. for 1 hour to obtain an amorphous polyester resin (C-1). The physical properties of the resin were as follows. The weight-average molecular weight in GPC was 17038, the acid value was 6.2 mgKOH/g and the glass transition point was 63° C.

—Production of Amorphous Polyester Resin 2—

To a reactor that had been thoroughly dried beforehand there were added a 2.2 molar ethylene oxide adduct of bisphenol A (35 parts by mole), a 2.3 molar propylene oxide adduct of bisphenol A (65 parts by mole), ethylene glycol (73 parts by mole), terephthalic acid (36.5 parts by mole), dimethyl terephthalate (36.5 parts by mole), tetrapropenylsuccinic anhydride (15 parts by mole) and trimellitic anhydride (8 parts by mole). The reaction mixture was heated to 180° C. while stirring with nitrogen aeration. As the catalyst, n-tetrabutoxytitanium (0.05 part by mole) was added to the reactor, and the temperature was raised to 250° C. The pressure was then reduced until the pressure inside the reactor finally reached 2 kPa or lower, and polycondensation reaction was conducted at 250° C. for 6 hours. After restoration to ordinary pressure, trimellitic anhydride (5.2 parts by mole) was added to the reactor, and then reaction was conducted at 210° C. for 1 hour to obtain an amorphous polyester resin (C-2). The physical properties of the resin were as follows. The weight-average molecular weight in GPC was 45560, the acid value was 12.1 mgKOH/g and the glass transition point was 59.1° C.

—Preparation of Crystalline Polyester Resin Dispersion—

(Dispersion LA-1)

To a three-necked flask there were added crystalline polyester resin (A-1) (56 parts by mass), methyl ethyl ketone (35 parts by mass) and 2-propyl alcohol (9 parts by mass). Next, stirring was carried out with a three-one motor to dissolve the crystalline polyester resin, and then 26 parts by mass of a 5 mass % ammonia water solution was added. Also, ion-exchanged water (94 parts by mass) was slowly added for reverse phase emulsification, and then the solvent was removed. Next, ion-exchanged water was added to adjust the solid concentration (crystalline polyester resin concentration) to 30 mass %, and a crystalline polyester resin dispersion (LA-1) was obtained as a binder resin dispersion for toner. The volume-average particle diameter (D50v) of the resin particles in the dispersion was 223 nm.

(Dispersion LA-2)

Emulsification was carried out in the same manner as for preparation of dispersion LA-1, using crystalline polyester resin (A-2), and a crystalline polyester resin dispersion (LA-2) was obtained as a binder resin dispersion for toner. The volume-average particle diameter (D50v) of the resin particles in the dispersion was 197 nm.

(Dispersion LA-3)

Emulsification was carried out in the same manner as for preparation of dispersion LA-1, using crystalline polyester resin (A-3), and a crystalline polyester resin dispersion (LA-3) was obtained as a binder resin dispersion for toner. The volume-average particle diameter (D50v) of the resin particles in the dispersion was 184 nm.

(Dispersion LA-4)

Emulsification was carried out in the same manner as for preparation of dispersion LA-1, using crystalline polyester resin (A-4), and a crystalline polyester resin dispersion (LA-4) was obtained as a binder resin dispersion for toner. The volume-average particle diameter (D50v) of the resin particles in the dispersion was 235 nm.

(Dispersion LA-5)

Emulsification was carried out in the same manner as for preparation of dispersion LA-1, using crystalline polyester resin (A-5), and a crystalline polyester resin dispersion (LA-5) was obtained as a binder resin dispersion for toner. The volume-average particle diameter (D50v) of the resin particles in the dispersion was 157 nm.

(Dispersion LA-6)

Emulsification was carried out in the same manner as for preparation of dispersion LA-1, using crystalline polyester resin (A-6), and a crystalline polyester resin dispersion (LA-6) was obtained as a binder resin dispersion for toner. The volume-average particle diameter (D50v) of the resin particles in the dispersion was 149 nm.

(Dispersion LA-7)

Emulsification was carried out in the same manner as for preparation of dispersion LA-1, using crystalline polyester resin (A-7), and a crystalline polyester resin dispersion (LA-7) was obtained as a binder resin dispersion for toner. The volume-average particle diameter (D50v) of the resin particles in the dispersion was 181 nm.

(Dispersion LA-8)

Emulsification was carried out in the same manner as for preparation of dispersion LA-1, using crystalline polyester resin (A-8), and a crystalline polyester resin dispersion (LA-8) was obtained as a binder resin dispersion for toner. The volume-average particle diameter (D50v) of the resin particles in the dispersion was 179 nm.

(Dispersion LA-9)

Emulsification was carried out in the same manner as for preparation of dispersion LA-1, using crystalline polyester resin (A-9), and a crystalline polyester resin dispersion (LA-9) was obtained as a binder resin dispersion for toner. The volume-average particle diameter (D50v) of the resin particles in the dispersion was 193 nm.

(Dispersion LA-10)

Emulsification was carried out in the same manner as for preparation of dispersion LA-1, using crystalline polyester resin (A-10), and a crystalline polyester resin dispersion (LA-10) was obtained as a binder resin dispersion for toner. The volume-average particle diameter (D50v) of the resin particles in the dispersion was 185 nm.

(Dispersion LA-11)

Emulsification was carried out in the same manner as for preparation of dispersion LA-1, using crystalline polyester resin (A-11), and a crystalline polyester resin dispersion (LA-11) was obtained as a binder resin dispersion for toner. The volume-average particle diameter (D50v) of the resin particles in the dispersion was 182 nm.

(Dispersion LA-12)

Emulsification was carried out in the same manner as for preparation of dispersion LA-1, using crystalline polyester resin (A-12), and a crystalline polyester resin dispersion (LA-12) was obtained as a binder resin dispersion for toner. The volume-average particle diameter (D50v) of the resin particles in the dispersion was 163 nm.

(Dispersion LA-13)

Emulsification was carried out in the same manner as for preparation of dispersion LA-1, using crystalline polyester resin (A-13), and a crystalline polyester resin dispersion (LA-13) was obtained as a binder resin dispersion for toner. The volume-average particle diameter (D50v) of the resin particles in the dispersion was 162 nm.

(Dispersion LA-14)

Emulsification was carried out in the same manner as for preparation of dispersion LA-1, using crystalline polyester resin (A-14), and a crystalline polyester resin dispersion (LA-14) was obtained as a binder resin dispersion for toner. The volume-average particle diameter (D50v) of the resin particles in the dispersion was 171 nm.

(Dispersion LB-1)

Emulsification was carried out in the same manner as for preparation of dispersion LA-1, using crystalline polyester resin (B-1), and a crystalline polyester resin dispersion (LB-1) was obtained as a binder resin dispersion for toner. The volume-average particle diameter (D50v) of the resin particles in the dispersion was 220 nm.

(Dispersion LB-2)

Emulsification was carried out in the same manner as for preparation of dispersion LA-1, using crystalline polyester resin (B-2), and a crystalline polyester resin dispersion (LB-2) was obtained as a binder resin dispersion for toner. The volume-average particle diameter (D50v) of the resin particles in the dispersion was 50 nm.

(Dispersion LB-3)

Emulsification was carried out in the same manner as for preparation of dispersion LA-1, using crystalline polyester resin (B-3), and a crystalline polyester resin dispersion (LB-3) was obtained as a binder resin dispersion for toner. The volume-average particle diameter (D50v) of the resin particles in the dispersion was 64 nm.

(Dispersion LB-4)

Emulsification was carried out in the same manner as for preparation of dispersion LA-1, using crystalline polyester resin (B-4), and a crystalline polyester resin dispersion (LB-4) was obtained as a binder resin dispersion for toner. The volume-average particle diameter (D50v) of the resin particles in the dispersion was 304 nm.

(Dispersion LB-5)

Emulsification was carried out in the same manner as for preparation of dispersion LA-1, using crystalline polyester resin (B-5), and a crystalline polyester resin dispersion (LB-5) was obtained as a binder resin dispersion for toner. The volume-average particle diameter (D50v) of the resin particles in the dispersion was 154 nm.

(Dispersion LB-6)

Emulsification was carried out in the same manner as for preparation of dispersion LA-1, using crystalline polyester resin (B-6), and a crystalline polyester resin dispersion (LB-6) was obtained as a binder resin dispersion for toner. The volume-average particle diameter (D50v) of the resin particles in the dispersion was 239 nm.

(Dispersion LB-7)

Emulsification was carried out in the same manner as for preparation of dispersion LA-1, using crystalline polyester resin (B-7), and a crystalline polyester resin dispersion (LB-7) was obtained as a binder resin dispersion for toner. The volume-average particle diameter (D50v) of the resin particles in the dispersion was 112 nm.

(Dispersion LB-8)

Emulsification was carried out in the same manner as for preparation of dispersion LA-1, using crystalline polyester resin (B-8), and a crystalline polyester resin dispersion (LB-8) was obtained as a binder resin dispersion for toner. The volume-average particle diameter (D50v) of the resin particles in the dispersion was 194 nm.

—Preparation of Amorphous Polyester Resin Dispersion—

(Dispersion LC-1)

To a three-necked flask there were added amorphous polyester resin (C-1) (56 parts by mass), methyl ethyl ketone (35 parts by mass) and 2-propyl alcohol (9 parts by mass). Next, stirring was carried out with a three-one motor to dissolve the amorphous polyester resin, and then 26 parts by mass of a 5 mass % ammonia water solution was added.

Also, ion-exchanged water (94 parts by mass) was slowly added for reverse phase emulsification, and then the solvent was removed. Next, ion-exchanged water was added to adjust the solid concentration to 30 mass %, to obtain an amorphous polyester resin dispersion (LC-1). The volume-average particle diameter (D50v) of the resin particles in the dispersion was 165 mm (Dispersion LC-2)

Emulsification was carried out in the same manner as for preparation of dispersion LC-1, using amorphous polyester resin (C-2), and a crystalline polyester resin dispersion (LC-2) was obtained. The volume-average particle diameter (D50v) of the resin particles in the dispersion was 198 mm —Preparation of Coloring Agent Dispersions—

With each of four different colored coloring agents (carbon black, C.I. Pigment Blue 15:3, C.I. Pigment Yellow 12, C.I. Pigment Red 48:1) there were mixed an anionic surfactant (trade name: NEOGEN RK, product of Dai-ichi Kogyo Seiyaku Co., Ltd.), ion-exchanged water and 1 mm-diameter glass beads. Next, each mixture was shaken for 10 hours while maintaining ordinary temperature, and then the glass beads were separated out with a nylon mesh to obtain four coloring agent dispersions.

—Preparation of Release Agent Dispersion—

With paraffin wax (trade name: HNP-9, product of Nippon Seiro Co., Ltd.) as a release agent there were mixed an anionic surfactant (trade name: NEOGEN RK, product of Dai-ichi Kogyo Seiyaku Co., Ltd.) and ion-exchanged water. After then hot melting at 110° C., a homogenizer apparatus (trade name: Homogenizer by Gaulin) was used for release agent dispersion treatment (pressure: 30 MPa), to obtain a release agent dispersion.

Examples 1 to 14 and Comparative Examples 1 to 8

—Production of Toners—

Example 1

In a round stainless steel container there were mixed crystalline polyester resin dispersion (LA-1) (50 parts by mass), amorphous polyester resin dispersion (LC-1) (250 parts by mass), amorphous polyester resin dispersion (LC-2) (200 parts by mass), a coloring agent dispersion (20 parts by mass) and a release agent dispersion (70 parts by mass). There was then further added to the mixture 1.5 parts by mass of a 10 mass % aqueous solution of aluminum sulfate as a flocculating agent, and the mixture was heated to 45° C. and agitated, and a temperature of 45° C. was maintained for 30 minutes. The temperature of the obtained contents was then slowly raised to 55° C. A sodium hydroxide aqueous solution was added to the aforementioned contents to adjust the pH to 8, and the temperature was raised to 90° C. Next, resin particles were added over a period of about 1 hour and allowed to aggregate into a mass and cool. After cooling, the contents were filtered and thoroughly rinsed with ion-exchanged water and dried to obtain toner (TA-1). Toners were prepared for each of the four coloring agent dispersions, to obtain a total of four different colored toners (TA-1).

Toners (TA-2) to (TA-14) and (TB-1) to (TB-8) were obtained in the same manner as preparation of toner (TA-1), except that crystalline polyester resin dispersions (LA-2) to (LA-14) and (LB-1) to (LB-8) were added as listed in Table 3 and Table 4, instead of the crystalline polyester resin dispersion (LA-1).

(Evaluation of Toner Performance)

The evaluation was conducted with an IPSIO C-45001T full color copier (trade name of Ricoh Co., Ltd.), modified for temperature adjustment. Each toner prepared as described above was mounted in a toner cartridge, used for printing of a halftone image with an image density of 0.8 to 0.85 on C2 paper by Fuji Xerox Co., Ltd., and evaluated. The temperature was measured with a thin-film thermometer situated between the fixing roller and the sheet. For the following evaluations of low-temperature fixability, hot offset resistance, image gloss property, storability and color reproducibility, the four prepared toners were separately tested and assigned points on the following scale, based on levels a to d obtained for the four toners.

Point level scale

Level a: 5 points

Level b: 3 points

Level c: 1 point

Level d: 0 points

Next, the total value of the points assigned in evaluation of the four colored toners was calculated for each property, and re-evaluation was conducted on the following scale with the results being recorded as the overall evaluation of the toner for each property. The evaluation results are summarized in Tables 3 and 4.

Evaluation of total number of points

A: Total of 16-20 points

B: Total of 11-15 points

C: Total of 6-10 points

D: Total of 0-5 points

<Low-Temperature Fixability>

The minimum fixing temperature onto paper was measured during printing at a printing speed of 50 sheets/min, and judged on the following scale. For the fixability, the minimum fixing temperature was defined as the temperature at which the reduction in density was no greater than 15% as the average at 5 points, after 5 reciprocal rubbing passes on the printed image with lens-cleaning paper under a 4.9 kPa load.

Level a: No blotting even at 130° C. or below.

Level b: No blotting from ≤140° C.

Level c: No blotting from ≤150° C.

Level d: Blotting even at 160° C. or higher.

<Hot Offset Resistance>

The condition of image blotting of the fixing roller and print was visually confirmed after printing at a printing speed of 50 sheets/min, and judged on the following scale.

Level a: No blotting even at 230° C. or higher.

Level b: Slight blotting at 230° C., but no blotting at 220° C.

Level c: Slight blotting at 220° C., but no blotting at 210° C.

Level d: Blotting even at 210° C.

<Image Gloss Property>

The full color copier specified above was used, with adjustment so that $1.0\pm0.1 mg/cm^2$ of toner developed on the printed matter, to produce a solid image sample when the fixing belt surface temperature was 150° C. Using a gloss meter (Gloss meter by BYK-GARDER GMBH, trade name: MICRO-TRI-gloss), measurement was performed at a total of 5 points, at the center section of the image and at 2.5 cm sections from the center section toward the 4 corners, at an incident angle of 60°, and the average value was recorded as the glossiness and judged on the following scale.

Level a: Glossiness of greater than 25 and no greater than 30.

Level b: Glossiness of greater than 20 and no greater than 25.

Level c: Glossiness of greater than 10 and no greater than 20.
Level d: Glossiness of no greater than 10.

<Storability>

After placing 5 g of toner in a 50 mL glass sample bottle, it was allowed to stand for 24 hours in a dryer at a temperature of 50° C. and then cooled at room temperature for 24 hours. This step was defined as one cycle, and two such cycles were repeated. The state of aggregation of the toner after two cycles was visually examined and judged on the following scale.

Level a: Toner easily flowed when the sample bottle was inverted.
Level b: Toner flowed when the sample bottle was inverted and tapped 2-3 times (no solidification).
Level c: Toner flowed when the sample bottle was inverted and tapped 5-6 times (some solidification).
Level d: Toner failed to flow even when the sample bottle was inverted and tapped.

<Evaluation of Color Reproducibility> (Comparison Between Desired Color and Actually Developed Image Color)

The color reproducibility of fixed images was evaluated.
Level a: Absolutely no noticeable yellowness.
Level b: Virtually no noticeable yellowness.
Level c: Noticeable yellowness.
Level d: Considerable noticeable yellowness.

The evaluation results for Examples 1 to 14 are shown in Table 3. The evaluation results for Comparative Examples 1 to 8 are shown in Table 4.

TABLE 3

| Example | | 1 | 2 | 3 | 4 | 5 | 6 | 7 |
|---|---|---|---|---|---|---|---|---|
| Toner | | TA-1 | TA-2 | TA-3 | TA-4 | TA-5 | TA-6 | TA-7 |
| Composition (parts by mass) | LA-1 | 50 | — | — | — | — | — | — |
| | LA-2 | — | 50 | — | — | — | — | — |
| | LA-3 | — | — | 50 | — | — | — | — |
| | LA-4 | — | — | — | 50 | — | — | — |
| | LA-5 | — | — | — | — | 50 | — | — |
| | LA-6 | — | — | — | — | — | 50 | — |
| | LA-7 | — | — | — | — | — | — | 50 |
| | LA-8 | — | — | — | — | — | — | — |
| | LA-9 | — | — | — | — | — | — | — |
| | LA-10 | — | — | — | — | — | — | — |
| | LA-11 | — | — | — | — | — | — | — |
| | LA-12 | — | — | — | — | — | — | — |
| | LA-13 | — | — | — | — | — | — | — |
| | LC-1 | 250 | 250 | 250 | 250 | 250 | 250 | 250 |
| | LC-2 | 200 | 200 | 200 | 200 | 200 | 200 | 200 |
| | Coloring agent dispersion | 20 | 20 | 20 | 20 | 20 | 20 | 20 |
| | Release agent dispersion | 70 | 70 | 70 | 70 | 70 | 70 | 70 |
| Evaluation | Low-temperature fixability | A | A | A | B | A | B | A |
| | Hot offset resistance | A | A | B | A | B | A | B |
| | Image gloss property | B | A | A | B | B | B | B |
| | Storability | B | B | B | A | B | A | B |
| | Color reproducibility | B | B | A | B | A | B | B |

| Example | | 8 | 9 | 10 | 11 | 12 | 13 | 14 |
|---|---|---|---|---|---|---|---|---|
| Toner | | TA-8 | TA-9 | TA-10 | TA-11 | TA-12 | TA-13 | TA-14 |
| Composition (parts by mass) | LA-1 | — | — | — | — | — | — | — |
| | LA-2 | — | — | — | — | — | — | — |
| | LA-3 | — | — | — | — | — | — | — |
| | LA-4 | — | — | — | — | — | — | — |
| | LA-5 | — | — | — | — | — | — | — |
| | LA-6 | — | — | — | — | — | — | — |
| | LA-7 | — | — | — | — | — | — | — |
| | LA-8 | 50 | — | — | — | — | — | — |
| | LA-9 | — | 50 | — | — | — | — | 50 |
| | LA-10 | — | — | 50 | — | — | — | — |
| | LA-11 | — | — | — | 50 | — | — | — |
| | LA-12 | — | — | — | — | 50 | — | — |
| | LA-13 | — | — | — | — | — | 50 | — |
| | LC-1 | 250 | 250 | 250 | 250 | 250 | 250 | 250 |
| | LC-2 | 200 | 200 | 200 | 200 | 200 | 200 | 200 |
| | Coloring agent dispersion | 20 | 20 | 20 | 20 | 20 | 20 | 20 |
| | Release agent dispersion | 70 | 70 | 70 | 70 | 70 | 70 | 70 |
| Evaluation | Low-temperature fixability | A | A | A | A | A | A | A |
| | Hot offset resistance | A | B | A | A | A | A | B |

TABLE 3-continued

|  | | | | | | | |
|---|---|---|---|---|---|---|---|
| Image gloss property | A | B | A | A | B | B | A |
| Storability | A | B | B | B | B | B | B |
| Color reproducibility | B | B | B | B | B | B | B |

TABLE 4

| Comp. Ex. | | 1 | 2 | 3 | 4 | 5 | 6 | 7 | 8 |
|---|---|---|---|---|---|---|---|---|---|
| Toner | | TB-1 | TB-2 | TB-3 | TB-4 | TB-5 | TB-6 | TB-7 | TB-8 |
| Composition (parts by mass) | LB-1 | 50 | — | — | — | — | — | — | — |
| | LB-2 | — | 50 | — | — | — | — | — | — |
| | LB-3 | — | — | 50 | — | — | — | — | — |
| | LB-4 | — | — | — | 50 | — | — | — | — |
| | LB-5 | — | — | — | — | 50 | — | — | — |
| | LB-6 | — | — | — | — | — | 50 | — | — |
| | LB-7 | — | — | — | — | — | — | 50 | — |
| | LB-8 | — | — | — | — | — | — | — | 50 |
| | LC-1 | 250 | 250 | 250 | 250 | 250 | 250 | 250 | 250 |
| | LC-2 | 200 | 200 | 200 | 200 | 200 | 200 | 200 | 200 |
| | Coloring agent dispersion | 20 | 20 | 20 | 20 | 20 | 20 | 20 | 20 |
| | Release agent dispersion | 70 | 70 | 70 | 70 | 70 | 70 | 70 | 70 |
| Evaluation | Low-temperature fixability | A | C | A | C | C | A | C | A |
| | Hot offset resistance | C | B | C | A | B | C | B | C |
| | Image gloss property | A | C | C | C | C | C | C | B |
| | Storability | C | C | C | C | A | D | C | C |
| | Color reproducibility | A | C | A | B | B | B | B | B |

The crystalline polyester resins of Examples 1 to 14 exhibited specific storage elastic modulus behavior as shown in Table 1, and the volume electrical resistance was high with low static inhibition. When used as binder resin for toners, the crystalline polyester resins of Examples 1 to 14 exhibited the reciprocal performance of low-temperature fixability and hot offset resistance, as seen from Table 3. In addition, toners employing the crystalline polyester resins of Examples 1 to 14 also had excellent image gloss properties and storability.

The invention claimed is:

1. A crystalline polyester resin
obtained by condensation polymerization of a mixture comprising a polycarboxylic acid component and a polyol component,
present in a range such that the ratio of the number of carboxyl groups from the polycarboxylic acid component and the number of hydroxyl groups from the polyol component is in the range of 100:108 to 100:120, and
having an acid value of 5 to 20 mgKOH/g,
wherein the polycarboxylic acid component includes a C8-12 aliphatic dicarboxylic acid,
the content ratio of carboxyl groups from the C8-12 aliphatic dicarboxylic acid is at least 90 mol % of the total amount of carboxyl groups from the polycarboxylic acid component,
the polyol component includes a C8-12 aliphatic diol, and
the content ratio of hydroxyl groups from the C8-12 aliphatic diol is at least 90 mol % of the total amount of hydroxyl groups from the polyol component.

2. The crystalline polyester resin according to claim 1, wherein the mixture further includes a monocarboxylic acid, the ratio of the number of carboxyl groups from the polycarboxylic acid component and the number of carboxyl groups from the monocarboxylic acid is greater than 100:0 and up to 100:5.

3. The crystalline polyester resin according to claim 2, wherein the monocarboxylic acid is at least one selected from the group consisting of aliphatic monocarboxylic acid compounds, aromatic monocarboxylic acid compounds, and acid anhydrides and lower alkyl esters thereof.

4. The crystalline polyester resin according to claim 2, wherein the monocarboxylic acid is at least one selected from the group consisting of C8-18 aliphatic monocarboxylic acids, and acid anhydrides and lower alkyl esters thereof.

5. The crystalline polyester resin according to claim 2, wherein the monocarboxylic acid has at least one selected from the group consisting of capric acid, lauric acid, myristic acid, palmitic acid, margaric acid, stearic acid, cyclohexanecarboxylic acids, benzoic acid, methylbenzoic acid, phenoxyacetic acid, phenylpropionic acid, naphthalenecarboxylic acid, naphthoic acid, and acid anhydrides and lower alkyl esters thereof.

6. The crystalline polyester resin according to claim 1, wherein:
when the storage elastic modulus of the crystalline polyester resin measured at a cooling rate of 5° C./min is 1000 Pa to 1 Pa, the temperature of the crystalline polyester resin is 57° C. to 63° C.,
when the storage elastic modulus of the crystalline polyester resin measured at a cooling rate of 1° C./min is 1000 Pa to 1 Pa, the temperature of the crystalline polyester resin is 58° C. to 65° C., the rate of change D defined by formula (1) is 1.3 to 4.0, the rate of change E defined by formula (2) is 1.4 to 4.0, and the rate of change F defined by formula (3) is 1.4 to 3.0.

$$D = \frac{(\text{Log}10 - \text{Log}10^3)/(Tb_5 - Ta_5)}{(\text{Log}1 - \text{Log}10)/(Tc_5 - Tb_5)} \quad (1)$$

$$E = \frac{(\text{Log}1 - \text{Log}10)/(Tc_1 - Tb_1)}{(\text{Log}1 - \text{Log}10)/(Tc_5 - Tb_5)} \quad (2)$$

$$F = \frac{(\text{Log}10 - \text{Log}10^3)/(Tb_1 - Ta_1)}{(\text{Log}10 - \text{Log}10^3)/(Tb_5 - Ta_5)} \quad (3)$$

wherein, in the formula,

Log represents common logarithm, $Ta_5$ represents the temperature of the crystalline polyester resin when the storage elastic modulus of the crystalline polyester resin measured at a cooling rate of 5° C./min is 1000 Pa, $Tb_5$ represents the temperature of the crystalline polyester resin when the storage elastic modulus of the crystalline polyester resin measured at a cooling rate of 5° C./min is 10 Pa, $Tc_5$ represents the temperature of the crystalline polyester resin when the storage elastic modulus of the crystalline polyester resin measured at a cooling rate of 5° C./min is 1 Pa, $Ta_1$ represents the temperature of the crystalline polyester resin when the storage elastic modulus of the crystalline polyester resin measured at a cooling rate of 1° C./min is 1000 Pa, $Tb_1$ represents the temperature of the crystalline polyester resin when the storage elastic modulus of the crystalline polyester resin measured at a cooling rate of 1° C./min is 10 Pa, and $Tc_1$ represents the temperature of the crystalline polyester resin when the storage elastic modulus of the crystalline polyester resin measured at a cooling rate of 1° C./min is 1 Pa.

7. The crystalline polyester resin according to claim 1 wherein the melting point is 65° C. to 75° C. and the weight-average molecular weight is 5000 to 12000.

8. A crystalline polyester resin according to claim 1, wherein the volume electrical resistance is $1.0 \times 10^{12}$ Ω·cm or greater.

9. A binder resin dispersion for toner comprising the crystalline polyester resin according to claim 1 and an aqueous medium, wherein the crystalline polyester resin is dispersed or emulsified in the aqueous medium.

* * * * *